(12) United States Patent
Ollat et al.

(10) Patent No.: US 8,104,589 B2
(45) Date of Patent: Jan. 31, 2012

(54) ELECTRO-HYDRAULIC BRAKE ACTUATOR FOR VEHICLE BRAKE

(75) Inventors: Xavier Ollat, Dana Point, CA (US);
Yingpei Guo, San Diego, CA (US);
Robert Lotter, Anaheim, CA (US)

(73) Assignee: Whittaker Corporation, Simi Valley, CA (US)

( * ) Notice: Subject to any disclaimer, the term of this patent is extended or adjusted under 35 U.S.C. 154(b) by 768 days.

(21) Appl. No.: 12/176,242

(22) Filed: Jul. 18, 2008

(65) Prior Publication Data

US 2010/0012445 A1    Jan. 21, 2010

(51) Int. Cl.
*F16D 55/32* (2006.01)
*F16D 65/24* (2006.01)

(52) U.S. Cl. ........ 188/72.6; 188/161; 188/170; 188/173

(58) Field of Classification Search ................. 188/72.1, 188/72.4, 72.6, 72.7, 72.9, 156, 157, 158, 188/159, 161, 162, 170, 171, 173
See application file for complete search history.

(56) References Cited

U.S. PATENT DOCUMENTS

| | | | |
|---|---|---|---|
| 3,043,405 A * | 7/1962 | Sussebach | 188/170 |
| 3,151,708 A * | 10/1964 | Trombetta | 188/171 |
| 3,181,665 A * | 5/1965 | Trombetta | 188/170 |
| 3,297,115 A * | 1/1967 | Waloen et al. | 188/170 |
| 3,441,111 A * | 4/1969 | Spalding | 188/170 |
| 3,456,767 A * | 7/1969 | Hollnagel et al. | 188/170 |
| 3,561,573 A * | 2/1971 | Laird, Jr. | 188/171 |
| 3,893,549 A * | 7/1975 | Bennett | 188/170 |
| 3,954,304 A | 5/1976 | Engle | |
| 4,031,987 A | 6/1977 | Webb | |
| 4,192,405 A * | 3/1980 | Lee et al. | 188/170 |
| 4,784,244 A | 11/1988 | Carre et al. | |
| 5,246,281 A | 9/1993 | Leppek | |
| 5,310,251 A * | 5/1994 | Towers et al. | 303/11 |
| 5,443,306 A | 8/1995 | Broome | |
| 5,558,409 A | 9/1996 | Walenty et al. | |
| 5,667,283 A | 9/1997 | Drennen et al. | |

(Continued)

FOREIGN PATENT DOCUMENTS

JP    4-154468    5/1992

(Continued)

OTHER PUBLICATIONS

Audi AG, The new Audi A5 / Audi S5 dated Feb. 24, 2007, Ingolstadt, Germany.

(Continued)

*Primary Examiner* — Thomas J Williams
(74) *Attorney, Agent, or Firm* — Knobbe, Martens, Olson & Bear, LLP

(57) ABSTRACT

An electro-hydraulic brake actuator for a vehicle can include an electric motor configured to operate at about 28 Vdc, and to operate at about 2 Amps or less to hold a vehicle brake in a disengaged position. A hydraulic master piston can be operatively coupled to the electric motor, the hydraulic master piston configured to slidingly move within a master cylinder fillable with a hydraulic fluid such that advancement of the master piston within the master cylinder varies the hydraulic pressure supplied to the vehicle brake. The electric motor and hydraulic master cylinder are configured to fit within a wheel hub corresponding to the vehicle brake, the motor configured to operate the hydraulic master piston to vary the hydraulic pressure applied to the brake.

19 Claims, 20 Drawing Sheets

U.S. PATENT DOCUMENTS

| | | | |
|---|---|---|---|
| 5,722,744 A | 3/1998 | Kupfer et al. | |
| 6,053,706 A | 4/2000 | Allen | |
| 6,412,608 B1 * | 7/2002 | Mohr et al. | 188/156 |
| 6,457,783 B1 * | 10/2002 | Schanzenbach et al. | 188/156 |
| 6,471,015 B1 * | 10/2002 | Ralea et al. | 188/1.11 L |
| 6,550,870 B1 * | 4/2003 | Goodzey | 303/9 |
| 2003/0122037 A1 * | 7/2003 | Hyde et al. | 244/134 A |
| 2005/0103583 A1 * | 5/2005 | Baumgartner et al. | 188/156 |
| 2007/0188018 A1 | 8/2007 | Reuter et al. | |

FOREIGN PATENT DOCUMENTS

JP    04154468 A * 5/1992

OTHER PUBLICATIONS

International search report and written opinion mailed on Aug. 20, 2009, received in PCT Application No. PCT/US09/48287.

U.S. Appl. No. 12/176,273, filed Jul. 18, 2008, Ollat, Xavier et al.

* cited by examiner

ELECTRO-HYDRAULIC BRAKE ACTUATOR FOR VEHICLE BRAKE

CROSS-REFERENCE TO RELATED APPLICATIONS

This application is related to U.S. patent application Ser. No. 12/176,273, filed Jul. 18, 2008, the entire contents of which are hereby incorporated by reference and should be considered a part of this specification.

BACKGROUND OF THE INVENTION

1. Field of the Invention

The present invention relates to a vehicle brake, and more particularly to an electro-hydraulic brake actuator for use in a brake of a vehicle.

2. Description of the Related Art

Conventional brake systems for vehicles include hydraulic systems found in automobiles, as well as pneumatic brake systems found on heavy duty commercial vehicles. In addition, electronically controlled brake systems are known. However, when vehicles incorporating such brake systems lose power, or there is a loss of hydraulic pressure or pneumatic pressure, the brake remains in a disengaged state. Additionally, said electronically controlled systems require a substantial amount of power to operate.

SUMMARY OF THE INVENTION

In view of the circumstances discussed above, one aspect of the invention is to provide an electro-hydraulic brake system that self-locks in an emergency (e.g., loss of power, loss of hydraulic pressure, etc.) and that requires little power to operate.

In accordance with one aspect of the present invention, an electro-hydraulic brake system for a vehicle is provided. The electro-hydraulic brake system comprises at least one hydraulic piston configured to exert a force on a brake pad in a direction away from a disc and opposite to a spring force exerted on the brake pad in a direction toward the disc by at least one spring, the brake pad moveable into contact with the disc to exert a braking force thereon. A hydraulic pressure actuator is in communication with the at least one hydraulic piston and configured to actuate the at least one hydraulic piston. A controller is configured to receive a brake command signal and to convert the brake command signal into a braking force demand, the controller configured to generate a brake actuator command based at least in part on the braking force demand and to communicate the brake actuator command to the hydraulic pressure actuator, the hydraulic pressure actuator configured to move the brake pad to a position corresponding to the brake actuator command and to maintain the brake pad at said position until the hydraulic pressure actuator receives another brake actuator command from the controller.

In accordance with another aspect of the present invention, an electro-hydraulic brake system for a vehicle is provided. The electro-hydraulic brake system comprises at least one hydraulic piston configured to exert a force on a brake pad in a direction opposite to a spring force exerted on the brake pad by at least one spring, the brake pad moveable to exert a braking force on a wheel of a vehicle. A master cylinder is in communication with the at least one hydraulic piston and configured to actuate the at least one hydraulic piston. A self-locking lead screw is configured to transmit an actuation force onto the master cylinder. A controller is configured to receive a brake command signal and to generate a brake actuator command based at least in part on a sensed brake demand, the controller configured to communicate the brake actuator command to the self-locking lead screw to thereby actuate the master cylinder to move the brake pad via the at least one hydraulic piston, the self-locking lead screw configured to move the brake pad to a position corresponding to the brake actuator command and to maintain the brake pad at said position until the self-locking lead screw receives another brake actuator command from the controller.

In accordance with still another aspect of the present invention, a method for operating an electro-hydraulic brake actuator for a vehicle brake is provided. The method comprises receiving a brake command, determining a brake actuator command based at least in part on the brake command, and communicating the brake actuator command to a brake actuator to move a brake pad to a position corresponding to the brake actuator command by adjusting a force exerted by at least one hydraulic piston on the brake pad in a direction opposite to a spring force exerted by at least one spring, the spring force exerted in a direction so as to engage the brake and the force exerted by the hydraulic piston being exerted in a direction so as to disengage the brake.

In accordance with yet another aspect of the present invention, an electro-hydraulic brake system for a vehicle is provided. The electro-hydraulic brake system comprises at least one hydraulic piston configured to exert a force on a brake pad in a direction away from a disc and opposite to a spring force exerted on the brake pad in a direction toward the disc by at least one spring, the brake pad moveable into contact with the disc to exert a braking force thereon, a hydraulic pressure actuator in communication with the at least one hydraulic piston and configured to actuate the at least one hydraulic piston, and a controller that actuates the hydraulic pressure actuator to advance the brake pad into engagement with the disc so as to exert a braking force corresponding to a brake command signal, the controller actuating the hydraulic pressure actuator to retract the brake pad from engagement with the disc until a detected brake force is approximately zero upon receipt of a brake release signal, wherein the brake pad moves into engagement with the disc when a loss of power or hydraulic pressure is detected.

In accordance with still another aspect of the present invention, an electro-hydraulic brake actuator for a vehicle brake having a default brake engagement position is provided. The electro-hydraulic brake actuator comprises an electric motor configured to operate at about 28 Vdc, the motor further configured to operate at about 2 Amps or less to hold a vehicle brake in a disengaged position. A hydraulic master piston is operatively coupled to the electric motor, the hydraulic master piston configured to slidingly move within a master cylinder fillable with a hydraulic fluid such that advancement of the master piston within the master cylinder varies the hydraulic pressure supplied to the vehicle brake. The electric motor and hydraulic master cylinder are configured to fit within a wheel hub corresponding to the vehicle brake, the motor configured to operate the hydraulic master piston to vary the hydraulic pressure applied to the vehicle brake.

In accordance with another aspect of the present invention, an electro-hydraulic brake actuator for a vehicle brake having a default brake engagement position is provided. The actuator comprises an electric motor configured to operate at about 28 Vdc, the motor further configured to operate at about 2 Amps or less to hold a vehicle brake in a disengaged position. A hydraulic master piston is operatively coupled to the electric motor via a cam nut moveable along a lead screw. The hydraulic master piston is configured to slidingly move within a master cylinder fillable with a hydraulic fluid such that advancement of the master piston within the master cylinder varies the hydraulic pressure supplied to the vehicle brake. The electric motor and hydraulic master cylinder are configured to fit within a wheel hub corresponding to the vehicle brake.

In accordance with still another aspect of the present invention, an electro-hydraulic brake actuator for a vehicle brake having a default brake engagement position is provided. The actuator comprises an electric motor configured to operate at about 28 Vdc, the motor further configured to operate at about 2 Amps or less to hold a vehicle brake in a disengaged position. A hydraulic master piston is operatively coupled to the electric motor via a lead screw driven by a gear train mechanism coupled to the lead screw and a shaft of the motor. The hydraulic master piston is configured to slidingly move within a master cylinder fillable with a hydraulic fluid such that advancement of the master piston within the master cylinder varies the hydraulic pressure supplied to the vehicle brake. The electric motor and hydraulic master cylinder are configured to fit within a wheel hub corresponding to the vehicle brake.

In accordance with yet another aspect of the present invention, a method for operating an electro-hydraulic brake actuator for a vehicle brake having a default brake engagement position is provided. The method comprises actuating an electric motor at about 28 Vdc, translating a master piston within a master cylinder to increase the hydraulic pressure within the master cylinder to thereby advance a brake pad of a vehicle brake into engagement with a disc of the vehicle brake, the master cylinder being operatively coupled to the electric motor, and actuating the motor to retract the master piston to move the vehicle brake into a disengaged position out of engagement with the disc upon receipt of a brake release signal, wherein the electric motor operates at about 2 Amps or less to hold the vehicle brake in a disengaged position.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 21 figures.

DETAILED DESCRIPTION OF THE PREFERRED EMBODIMENTS

Figure 1:
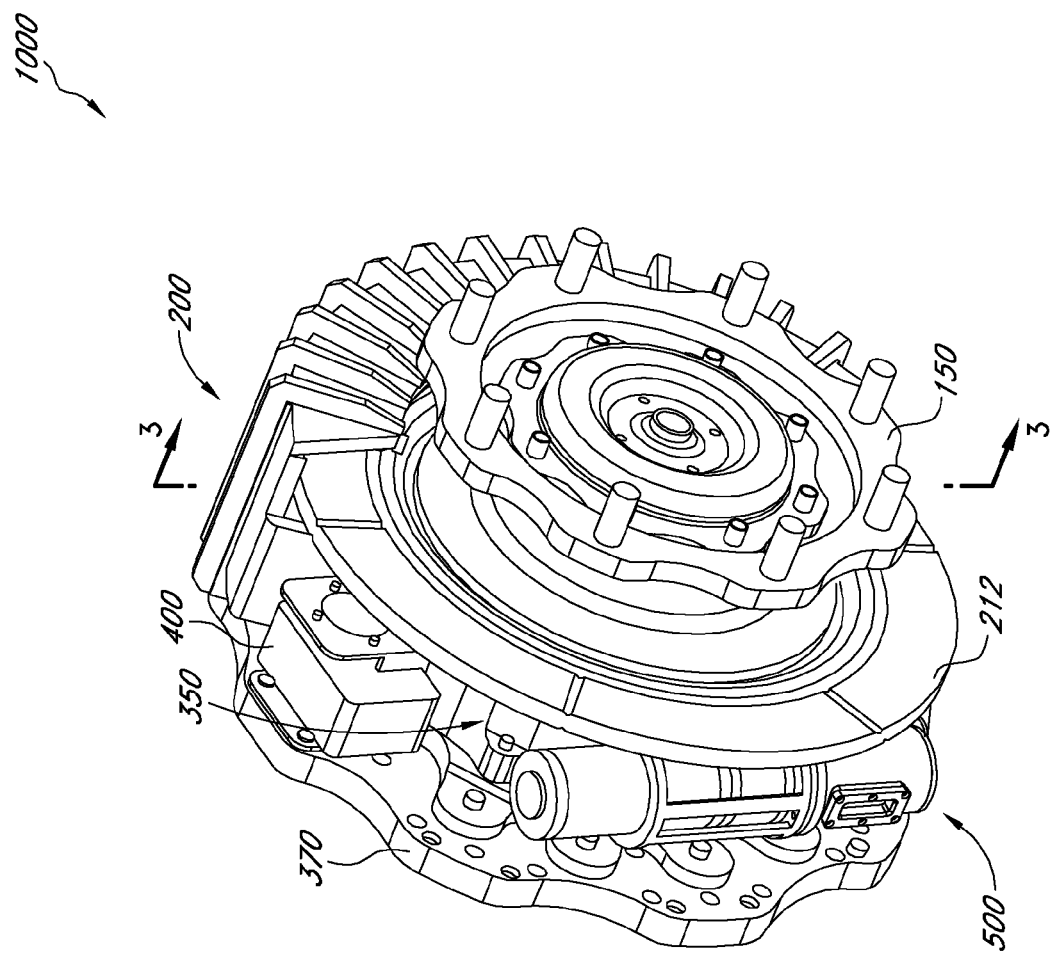
FIG. 1 is a schematic perspective view of one embodiment of an electro-hydraulic brake.
Figure 2:
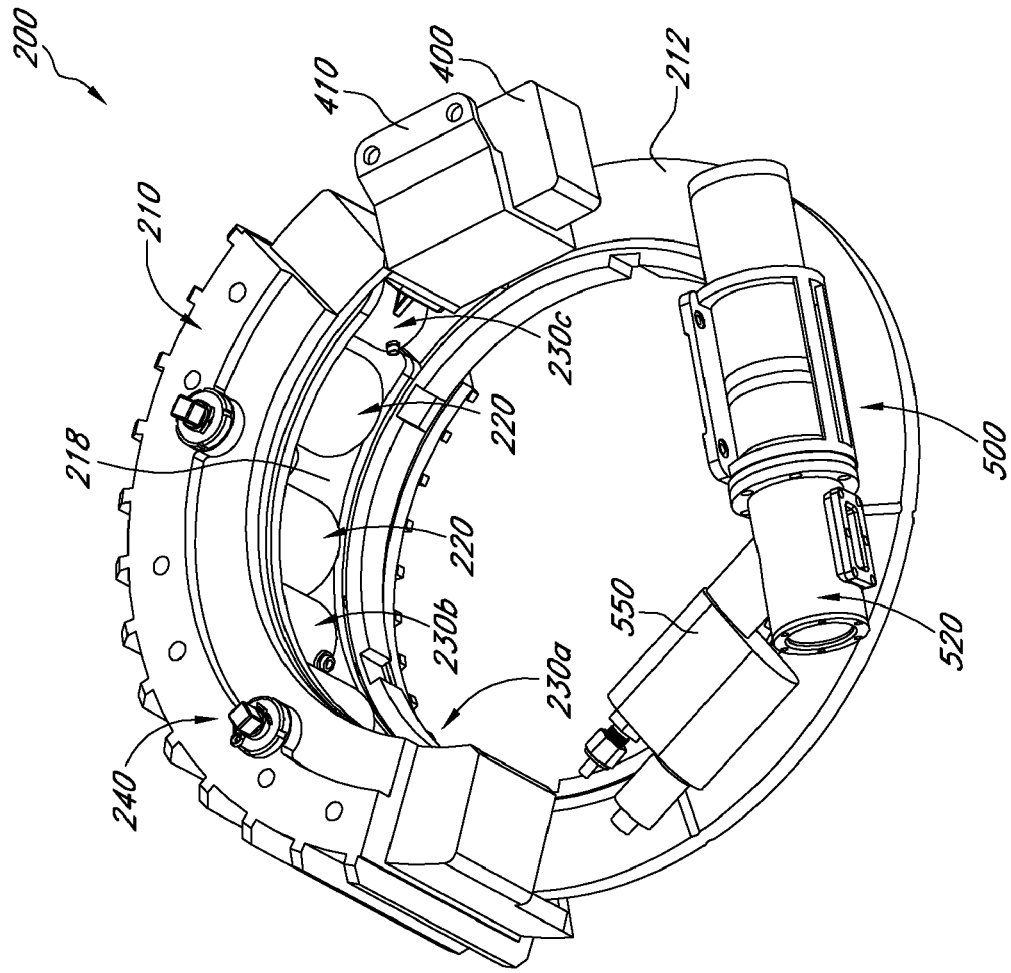
FIG. 2 is a schematic perspective sectional bottom view of a brake assembly of the electro-hydraulic brake of FIG. 1.
Figure 3:
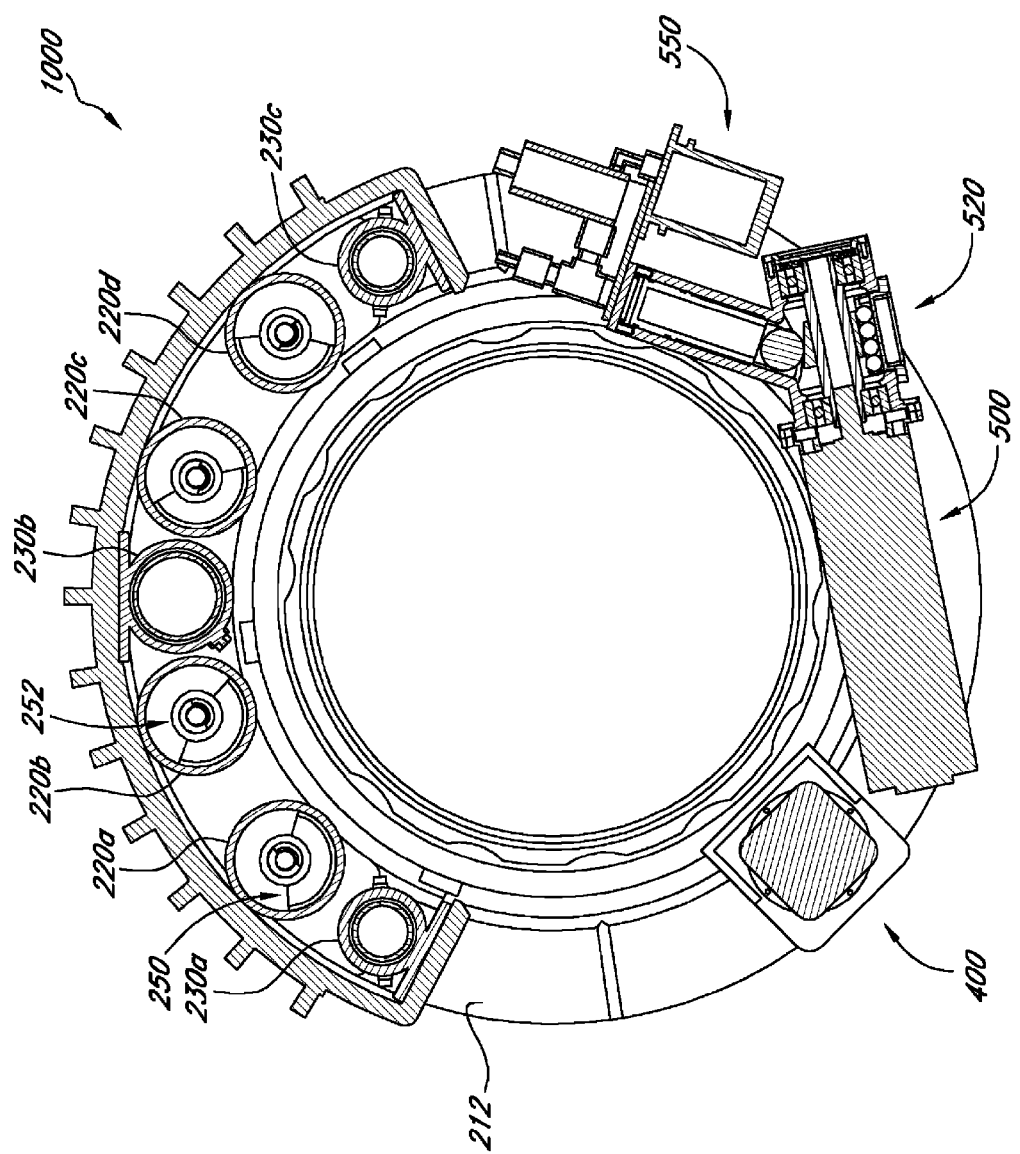
FIG. 3 is a schematic cross-sectional view of the electro-hydraulic brake of FIG. 1.

FIGS. 1-3 show one embodiment of an electro-hydraulic brake 1000. The electro-hydraulic brake 1000 includes a wheel hub interface 150 that can be attached to a wheel (not shown) of a vehicle. The brake 1000 also includes a brake assembly 200 having a brake disk 212 coupled to the wheel hub interface 150. The brake assembly 200 is described in further detail below.

In one embodiment (not shown), the brake can include a motor assembly that can power the rotation of the wheel of the vehicle. In one embodiment, each wheel of a vehicle can be independently driven with a separate motor assembly, where the motor assemblies are connected to a power source (not shown) via connectors. In another embodiment, the wheels of the vehicle can be driven centrally via an axle (not shown) by, for example, an internal combustion engine, an electric motor or a combination of the two, in a manner known in the art.

The electro-hydraulic brake 1000 can include a cylindrical housing 350 attached to an interface plate 370.

The electro-hydraulic brake 1000 in FIG. 1 can include a brake controller 400 and a brake actuator 500. The brake controller 400 can control the operation of the brake actuator 500 as further described below.

FIG. 2 shows a layout of the brake assembly 200 on the brake 1000. The brake assembly 200 includes a caliper 210 disposed about a portion of the brake disk 212. At least one hydraulic cylinder 230 and a spring housing 220 are disposed between the caliper 210 and the brake disc 212, the operation of which is described below. In the illustrated embodiment, the brake assembly 200 has three hydraulic cylinders 230a, 230b, 230c. In the illustrated embodiment, the controller 400 is disposed at least partially within a bracket 410, which can be fastened with at least one fastener (e.g. bolts, screws) to the interface plate 370, as shown in FIG. 1. In the illustrated embodiment, the controller 400 is positioned proximate an end of the caliper 210. The brake actuator 500 is arranged so as to generally extend along a portion of the circumference of the brake disc 212.

FIG. 3 shows a cross-sectional view of the brake 1000 along line 3-3 in FIG. 1. In the illustrated embodiment, the brake assembly 200 includes the three hydraulic cylinders 230a, 230b, 230c disposed at both ends of the caliper 210, as well as at a center position of the caliper 210. As discussed above, the hydraulic cylinders 230a-c extend between an inner surface of the caliper 210 and the brake disc 212. As shown in FIG. 3, four spring housings 220a-d are disposed between the caliper 210 and the brake disc 212, with two of said spring housings 220a, b disposed between two hydraulic cylinders 230a, 230b. However, in other embodiments, the brake assembly can have more or fewer hydraulic cylinders and more or fewer spring holder assemblies than those shown in the illustrated embodiment.

Figure 4:
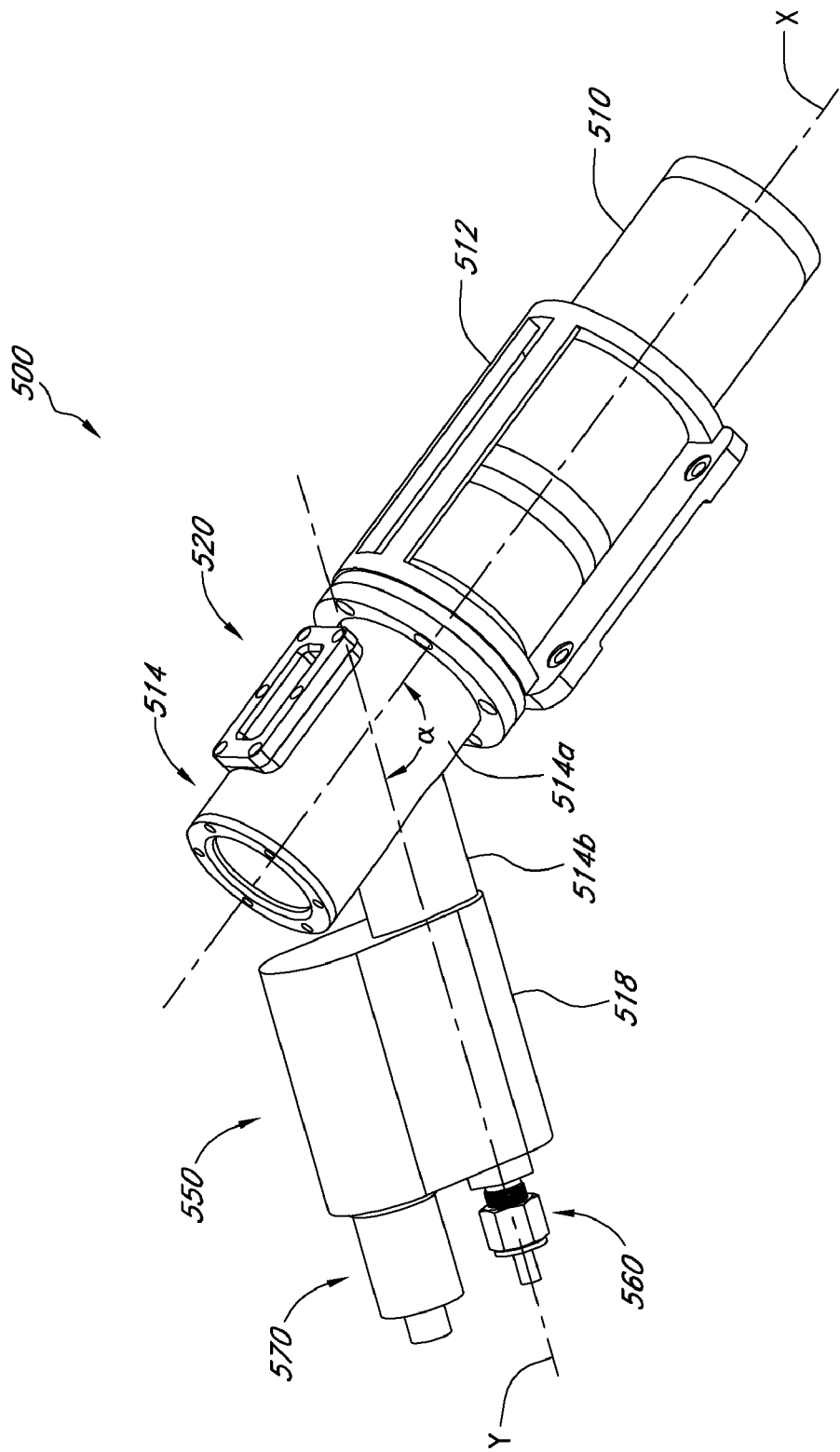
FIG. 4 is a schematic perspective view of one embodiment of an electro-hydraulic brake actuator for the electro-hydraulic brake of FIG. 1.

FIGS. 4-7 show one embodiment of the brake actuator 500. The brake actuator 500 can include a motor 510 extending along an axis X and include a mounting bracket 512 with which the actuator 500 can be attached, for example, to the gearbox assembly 350 (see FIG. 1). As shown in FIG. 4, the motor 510 can attach to an actuator housing 514, which can have a first portion 514a generally co-axial with the motor 510 and a second portion 514b extending along an axis Y at an angle α relative to the axis X. The second portion 514b of the actuator housing 514 attaches to a reservoir housing 518. In the illustrated embodiment, the actuator housing 514 houses a master cylinder assembly 520.

The actuator housing 514 is attached to the motor 510 and bracket 512 via a flange 516 that can be fastened to the bracket 512. Additionally, a cover 517 can be fastened to the actuator housing 514 at an opposite side of the actuator housing 514 from the motor 510 to substantially seal the actuator housing 514.

Figure 5:
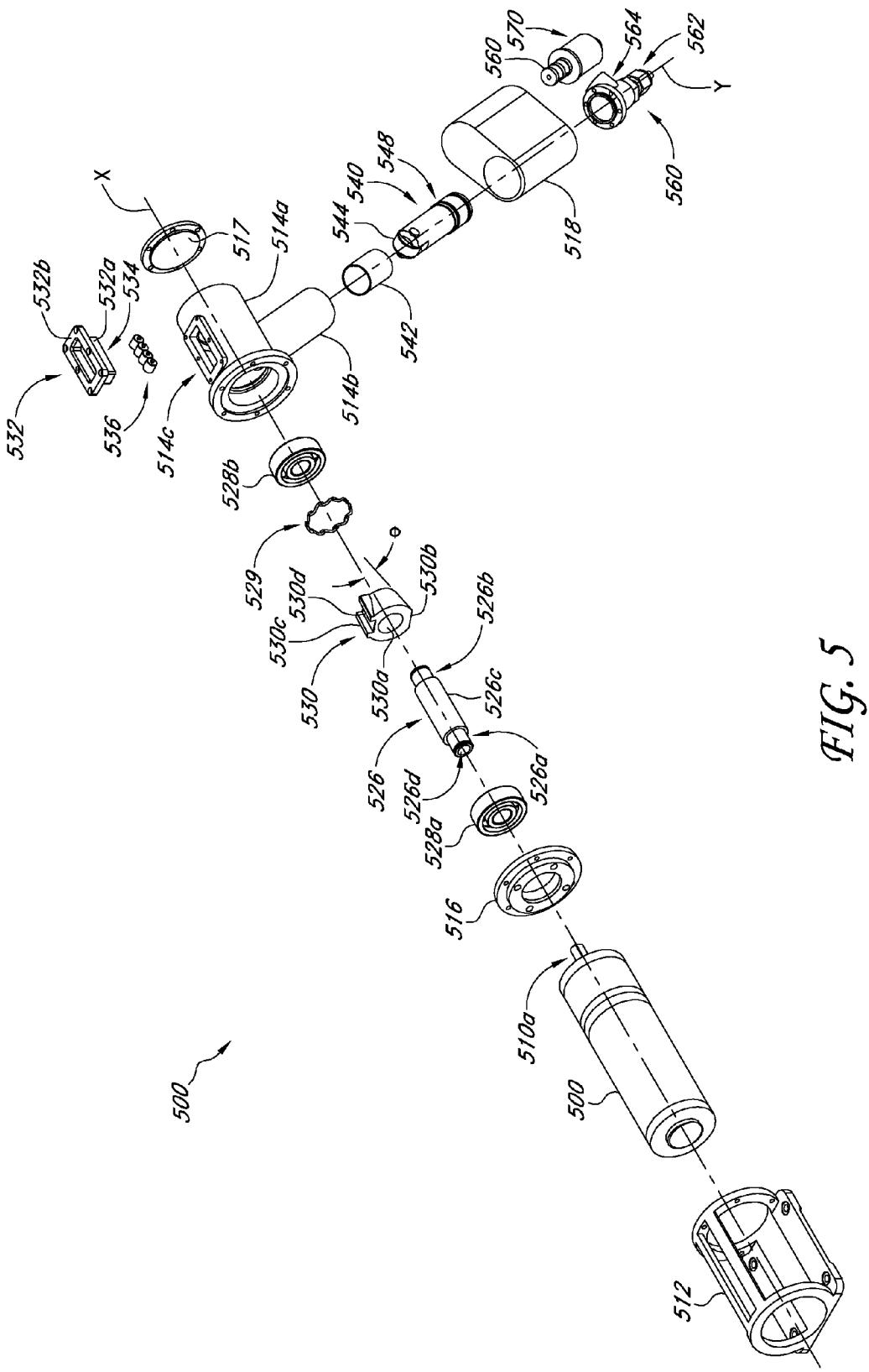
FIG. 5 is a schematic exploded view of the electro-hydraulic brake actuator of FIG. 4.

With continued reference to FIG. 5, the master cylinder assembly 520 can include a pair of bearings 528a, 528b disposed over shoulder portions 526a, 526b on opposite ends of a lead screw 526. A washer 529 is preferably disposed between the bearing 528b and the cover 517.

The lead screw 526 can include a threaded section 526c disposed between the shoulder sections 526a, 526b. The shoulder portion 526a of the lead screw 526 preferably has a bore 526d that can receive a shaft 510a of the motor 510. The bore 526d can be shaped to conform to the shape of the shaft 510a, thereby engaging the lead screw 526 to the motor 510 so that rotation of the shaft 510a results in rotation of the lead screw 526.

The threaded section 526c of the lead screw 526 preferably threadably engages a corresponding threaded surface 530a in a cam nut 530. The cam nut 530 has an outer tapered or inclined surface 530b that extends at an angle θ relative to the axis X of the brake actuator 500. In one embodiment, the angle θ is between about 1° and 89°. In another embodiment, the angle θ is between about 15° and 75°. In still another embodiment, the angle θ is between about 30° and 60°, inclusive. The cam nut 530 can also have a pair of flanges 530c on a surface opposite the tapered surface 530b. The flanges 530c are spaced apart so as to define a channel 530d therebetween. The channel 530d can receive a projecting portion 532a of a key 532 that can extend through an opening 514c in the first portion 514a of the actuator housing 514. A cover portion 532b of the key 532 can be attached to the first portion 514a of the actuator housing 514 to cover the opening 514c.

Figure 6:
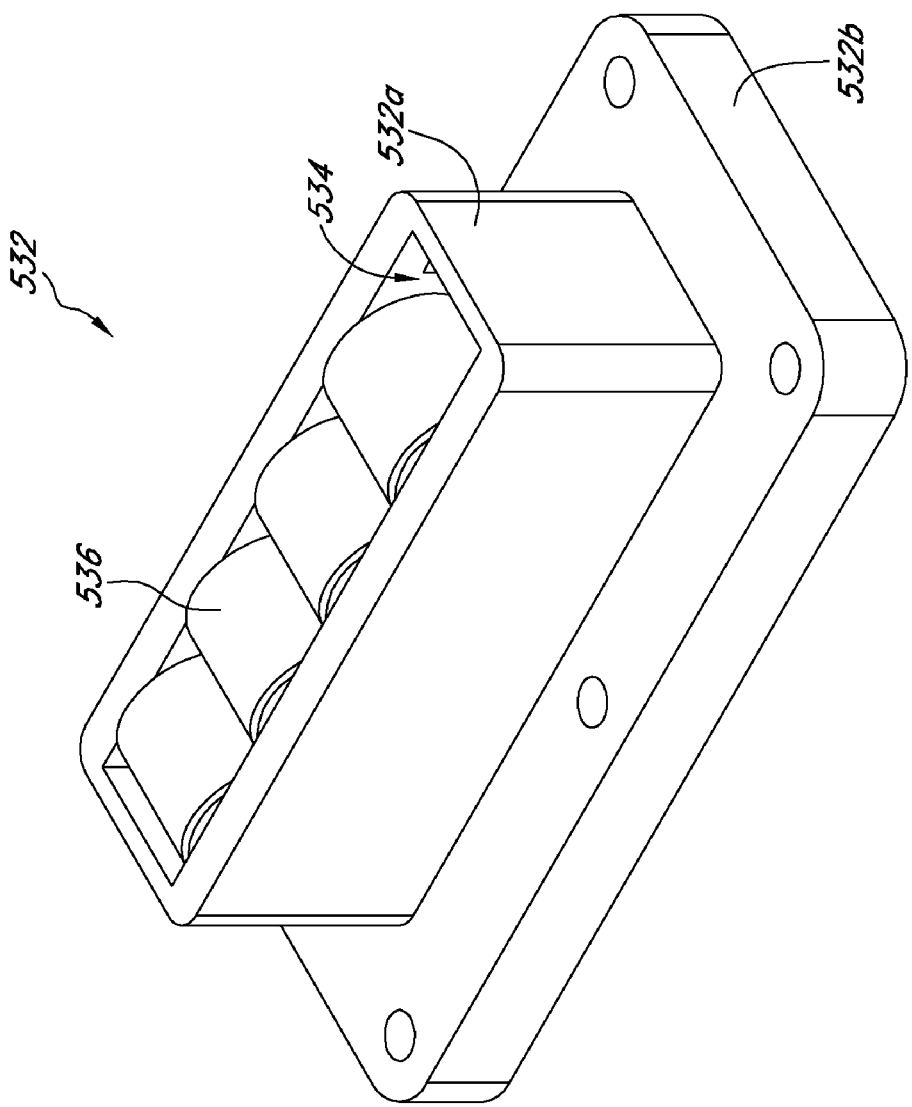
FIG. 6 is a schematic perspective view of one embodiment of a key for use in the electro-hydraulic brake actuator of FIG. 4.

As shown in FIGS. 5 and 6, the key 532 can have a recess 534 that removably receives at least one roller 536 therein. In the illustrated embodiment, four rollers 536 are rotatably attached to the key 532 within the recess 534. For example, each of the rollers 536 can be rotatably attached to the key 532 via an axle (not shown). Preferably, at least a portion of the rollers 536 extends out of the recess 534.

Figure 7:
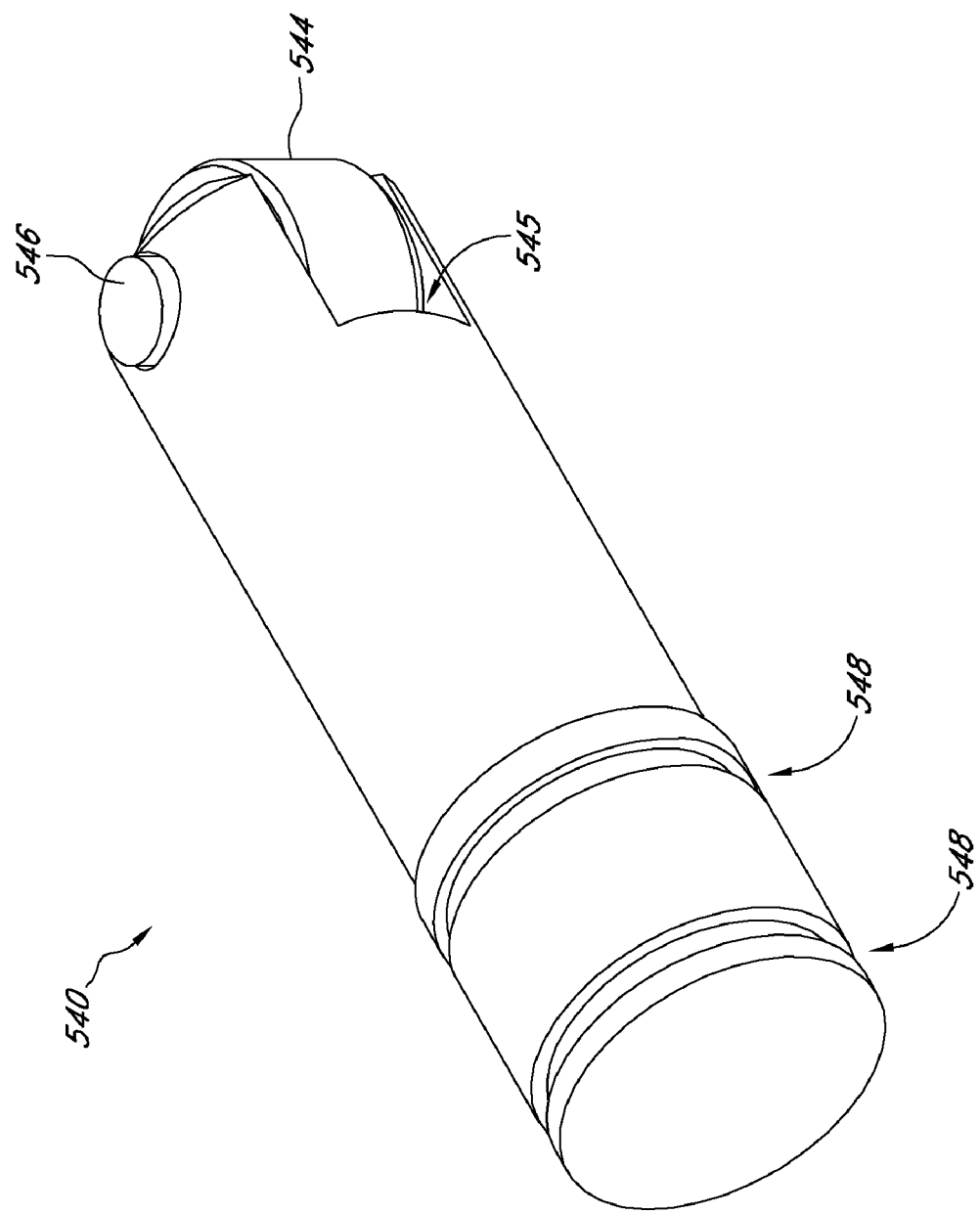
FIG. 7 is a schematic perspective view of one embodiment of a piston for use in the electro-hydraulic brake actuator of FIG. 4.

With continued reference to FIGS. 5 and 7, the brake actuator 500 includes a master piston 540 that movably slides within the second portion 514b or cylinder of the actuator housing 514. A sleeve bearing 542 can be disposed about at least a portion of the master piston 540 to facilitate the sliding of the master piston 540 within the cylinder or second portion 514b, which can hold a hydraulic fluid therein. The master piston 540 can include a roller 544 at least a portion of which is rotatably disposed within a recess 545 in one end of the master piston 540. The roller 544 can be attached to the master piston 540 via a pin or axle 546. As best shown in FIG. 7, the master piston 540 can also include at least one circumferential groove 548 sized to receive an O-ring (not shown) or other sealing member therein. In the illustrated embodiment, the master piston 540 has two circumferential grooves 548. However, in other embodiments, the master piston 540 can have more or fewer grooves 548 and corresponding O-rings.

The cylinder or second portion 514b of the actuator housing 514 attaches to an outlet manifold 560. The outlet manifold 560 can have an outlet fitting 562 that can be hydraulically coupled to the hydraulic cylinders 230 of the brake 1000 via hydraulic lines (not shown), in any suitable manner known in the art. The outlet manifold 560 can also have a side branch 564 that can couple to a bypass valve 570 in communication with the reservoir housing 518, wherein the reservoir 518 holds hydraulic fluid.

During operation, the controller 400 controls the operation of the brake controller 500. For example, the controller 400 communicates a signal to the motor 510 to operate the motor 500 to rotate the shaft 510a . As the shaft 510a of the motor 510 rotates, the lead screw 526, which is engaged with the shaft 510a, also rotates. Rotation of the lead screw 526 causes the cam nut 530 to translate axially along the lead screw 526. The projecting portion 532a of the key 532 extends into the channel 530d in the cam nut 530, thereby inhibiting the cam nut 530 from rotating about the lead screw 526. Additionally, the rollers 536 are in contact with a surface of the channel 530d and facilitate the translation of the cam nut 530 along the lead screw 526.

Translation of the cam nut 530 along the lead screw 526 causes the roller 544 of the piston 540 to move along the tapered surface 530b of the cam nut 530, which in turn causes the piston 540 to move axially within the cylinder or second portion 514b of the actuator housing 514. As noted above, the cylinder or second portion 514b can be filled with hydraulic fluid, so that movement of the piston 540 within the cylinder 514b can increase or decrease hydraulic pressure in a hydraulic line coupled to the outlet manifold 560 as the piston 540 moves toward or away from the outlet manifold 560, respectively. In the event of an emergency, the controller 400 can operate the bypass valve 570 to allow flow of hydraulic fluid from at least one of the hydraulic line(s) and cylinder 514b into the reservoir 518, thereby reducing the hydraulic pressure applied to the brake assembly 200 and allowing brake pads coupled to the caliper 210 to engage the brake disk 211 so as to apply a braking force thereto.

Figure 8:
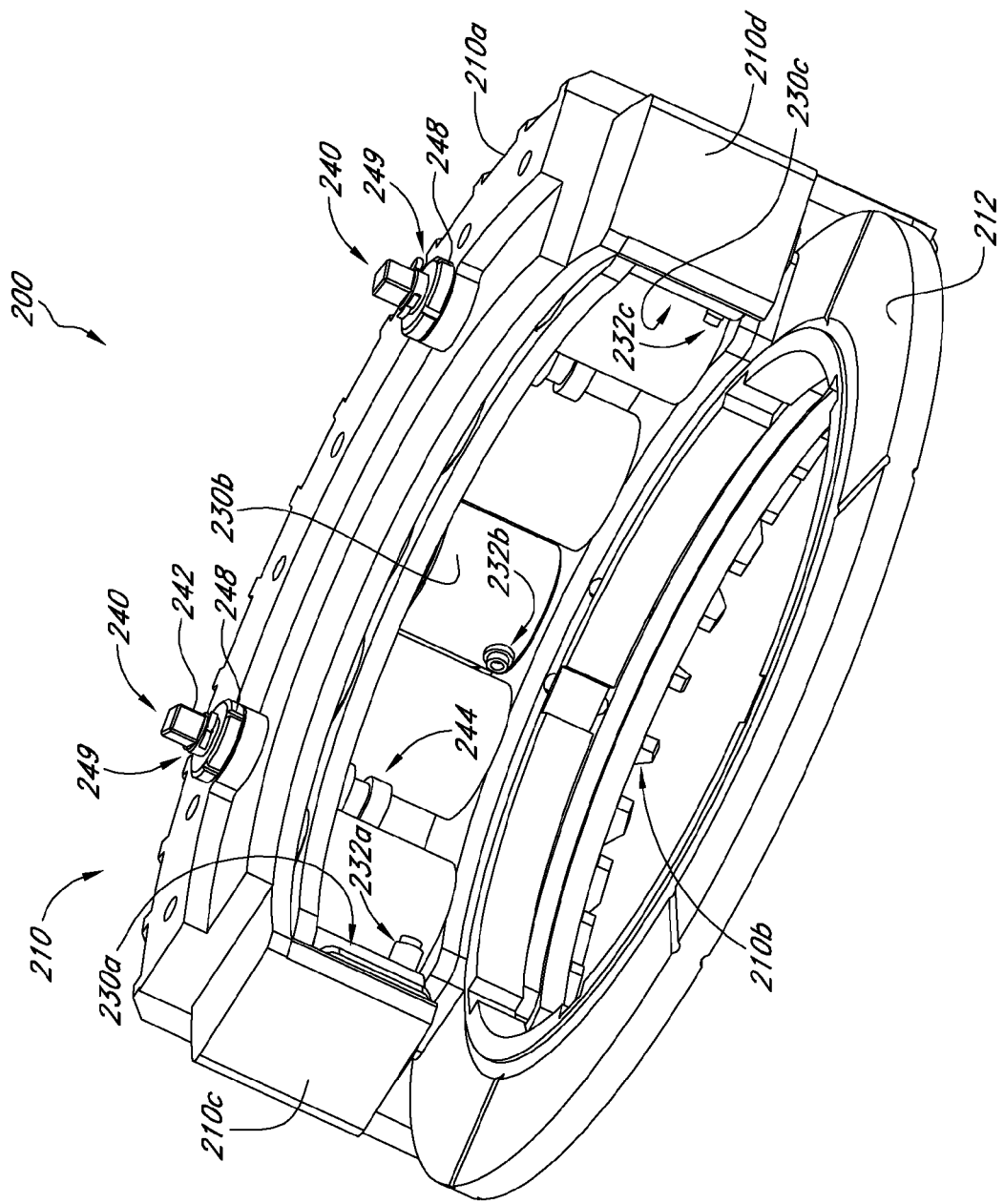
FIG. 8 is a schematic perspective view of one embodiment of a brake assembly for use in the electro-hydraulic brake of FIG. 1.
Figure 9:
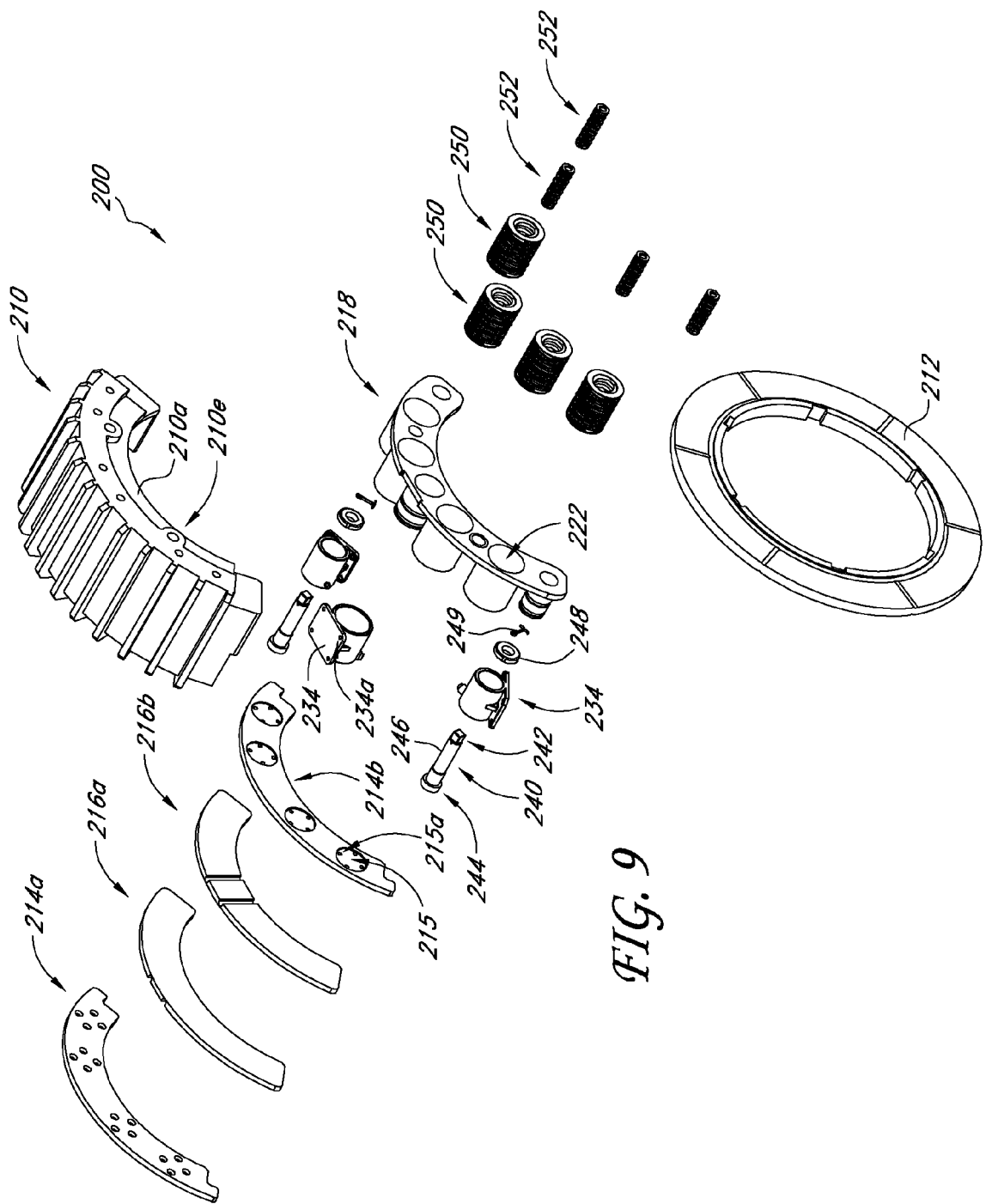
FIG. 9 is a schematic exploded view of the brake assembly of FIG. 8.
Figure 10:
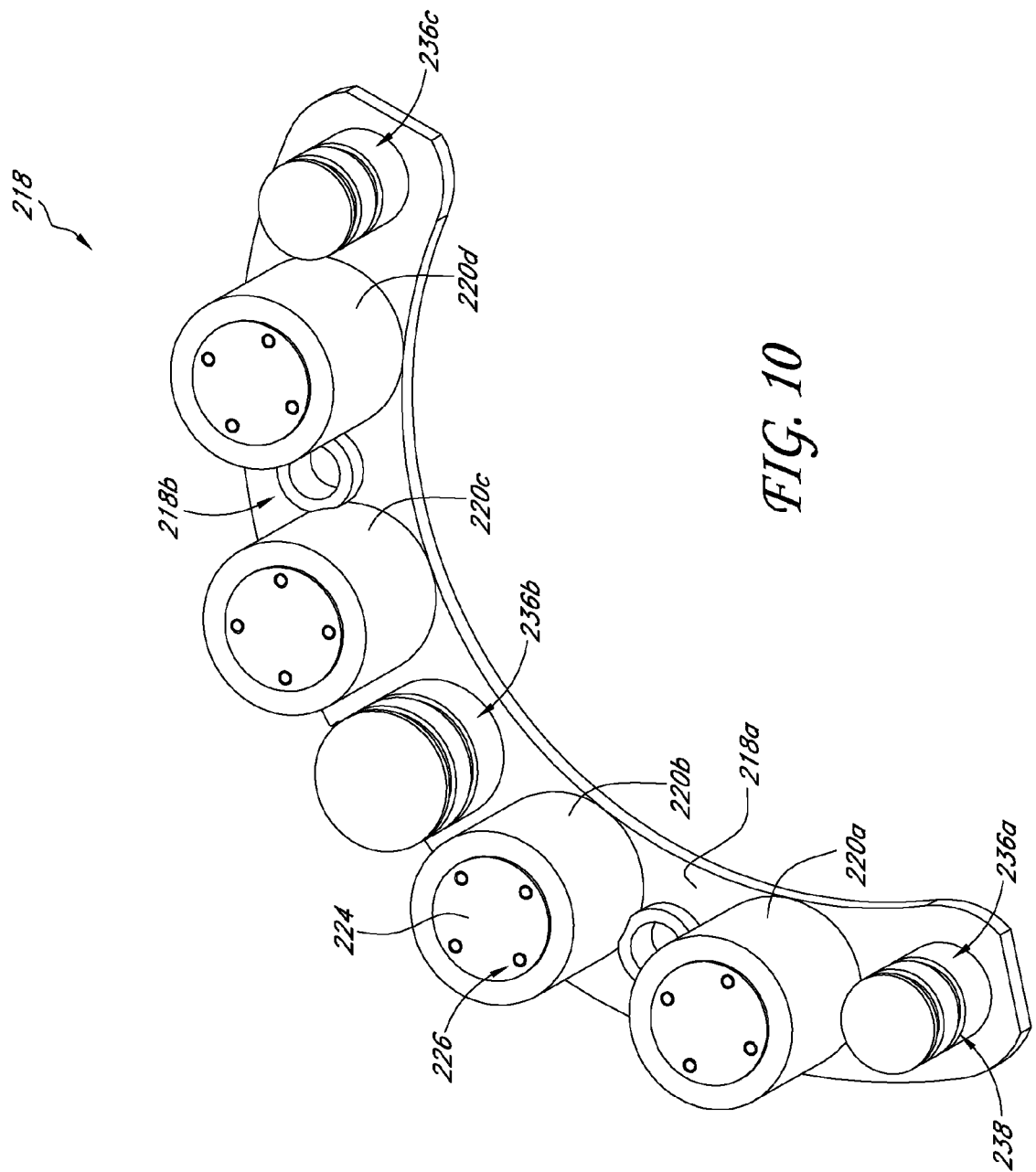
FIG. 10 is a schematic perspective top view of a plunge plate of the brake assembly of FIG. 8.

FIGS. 8-10 show one embodiment of the brake assembly 200, which can be used with the brake actuator 500 described above. As noted above, the caliper 210 is disposed about a portion of the brake disk 212. In the illustrated embodiment, the caliper 210 includes a top portion 210a that extends along a portion of the circumference of the brake disk 212. The caliper 210 also includes a bottom portion 210b disposed on an opposite side of the brake disk 212 from the top portion 210a. The caliper 210 can also include side portions 210c, 210d that extend from the top portion 210a toward the brake disk 212.

As best shown in FIGS. 8 and 9, brake liners 214a, 214b attached to brake pads 216a, 216b are disposed between the bottom portion 210b and the brake disk 212, and between the top portion 210a and the brake disk 212, respectively. The brake liner 214a can be attached to the bottom portion 210b of the caliper 210. Similarly the brake liner 214b can be attached to a plunge plate 218 disposed between the top portion 210a of the caliper 210 and the brake liner 214b. As noted above, the illustrated embodiment has four spring housings 220a-d and three hydraulic cylinders 230a, 230b, 230c disposed between the top portion 210a of the caliper 210 and the brake disk 212, the hydraulic cylinders 230a, 230b, 230c each having a corresponding hydraulic inlet connector 232a, 232b, 232c for attachment to at least one hydraulic line (not show) that in turn can attach to the outlet fitting 562 of the outlet manifold 560 of the brake actuator 500. The hydraulic cylinders 230a-c each have a mounting plate 234 with at least one fastener opening 234a via which the hydraulic cylinders 230a-c can be attached to the caliper 210. For example, one cylinder 230a can be attached to an end 210c of the caliper 210, another cylinder 230c can be attached to another end 210d of the caliper 210, and the third cylinder 230b can be attached to a rear inner surface (not shown) of the caliper 210. Accordingly, the hydraulic cylinders 230a-c are attached to the caliper 210 independently of the plunge plate 218.

As best shown in FIG. 10, in the illustrated embodiment the plunge plate 218 has a curved contour similar to the contour of the caliper 210. The plunge plate 218 includes a plate portion 218a and at least one opening 218b defined in the plate portion 218a. At least one piston projects from the plate portion 218. In the illustrated embodiments, the at least one piston includes three pistons 236a, 236b, 236c, with two of the pistons 236a, 236c disposed on opposite ends of the plunge plate 218 and the third piston 236b disposed generally at the center of the plunge plate 218. The pistons 236a-c are sized to slidingly fit within the corresponding cylinders 230a-c. The pistons 236a-c can each have at least one circumferential groove 238 sized to receive a sealing member (e.g., O-ring) therein in order to substantially seal the pistons 236a-c relative to their corresponding cylinders 230a-c. In the illustrated embodiment, each of the pistons 236a-c has two circumferential grooves 238. However, in other embodiments, the pistons 236a-c can have more or fewer circumferential grooves for receiving sealing members than in the illustrated embodiment.

The plunge plate 218 is preferably oriented so that the plate portion 218a is proximate an inner surface of the top portion 210a of the caliper 210 and the pistons 236a-c extend downward toward the brake disk 212. The spring housings 220 each can have an open end 222 and a closed end 224, with at least one opening 226 formed in the closed end 224 through which a fastener can be inserted to fasten the spring housings 220, and therefore the plunge plate 218, to the brake liner 214b. As best shown in FIG. 9 the brake liner 214b can have recessed portions 215, each having at least one fastener opening 215a, where the recessed portions 215 correspond to the spring housings 220. The recessed portions 215 can receive at least a portion of the corresponding spring housings 220 therein, and fasteners (e.g., screws) can be inserted through the fastener openings 215a, 226 in the brake liner 214b and spring housing 220, respectively.

As best shown in FIGS. 3 and 9, each of the spring housings 220 can house a spring therein. In the illustrated embodiment, each of the spring housings 220 houses two springs—a first spring 250 with a relatively larger diameter and a second spring 252 with a relatively smaller diameter, the second spring 252 being co-axial with the first spring 250 and disposed in a center of the first spring 250. Suitable springs can include Model Nos. 106-710 and 106-210 by AS Raymond. In one embodiment, at least a portion of at least one of the springs 250, 252 can extend out of the open end 222 of each spring housing 220 and abut against an inner surface (not shown) of the caliper 210 opposite the top portion 210a thereof With continued reference to FIGS. 8 and 9, the brake assembly 200 can also include at least one manual release and wear indicator member 240. In the illustrated embodiment, the brake assembly 200 has two manual release and indicator members 240. Each release and indicator member 240 can have a head portion 242, a base portion 244 and an elongated body 246 (e.g., a screw). The release and indicator members 240 can extend through the openings 218b in the plunge plate 218 and through corresponding openings 210e in the top portion 210a of the caliper 210. A lock nut 248 can be disposed over the head 242 of the release and indicator member 240 and adjacent the top portion 210a of the caliper 210. A lock wire 249 can be inserted though an opening in the head 242. To operate the manual brake release and indicator member 240, an operator can screw the nut 248 on the elongated member 246 to pull the plate portion 218a away from the brake disk 212. This in turn moves the brake pad 216b away from the brake disk 212 and compresses the springs 250, 252. On the other hand, the operator can un-screw the nut 248 on the elongated member 246, so that the spring force from the springs 250, 252 moves the plunge plate 218, and therefore the brake pad 216b, toward the brake disk 212 so that the brake pads 216a, 216b engage the brake disk 212.

As discussed above, the controller 400 can operate the brake actuator 500 to translate the master piston 540 along the cylinder or second portion 514b of the actuator housing 514 to thereby displace hydraulic fluid in the cylinder 514b through the outlet fitting 562 and the hydraulic line (e.g., tubing, piping) coupled to the outlet fitting 562 and hydraulic inlet connectors 232a -c of the hydraulic cylinders 230a -c . The hydraulic fluid enters via the hydraulic inlet connectors 232a -c into a space between the pistons 236a -c and the closed end of the cylinders 230a -c and apply a hydraulic force on the pistons 236a -c to thereby displace the pistons 236a -c toward the top portion 210a of the caliper 210. As the pistons 236a-c are attached to the plunge plate 218, movement of the pistons 236a -c toward the top portion 210a of the caliper 210 likewise moves the plunge plate 218 toward the top portion 210 of the caliper 210 and away from the brake disk 212. As discussed above, the brake liner 214b, which is attached to the brake pad 216b, is attached to the closed end 224 of the spring housings 220. Therefore, movement of the plunge plate 218 toward the top portion 210a of the caliper 210 and away from the brake disk 212 also moves the brake pad 216b away from the brake disk 212. The springs 250, 252 in turn exerts a force on the closed end 224 of the spring housings 220, and therefore on the brake pad 216b toward the brake disk 212.

Accordingly, absent the hydraulic force exerted on the pistons 236a -c, the springs 250, 252 urge the brake pad 216b into engagement with the brake disk 212, which causes the caliper 210 to shift so that the bottom portion 210b of the caliper 210 urges the liner 214a and attached brake pad 216a into engagement with the brake disk 212, so that the brake pads 216a, 216b exert a braking force on the brake disk 212. However, when the hydraulic force exerted on the pistons 236a-c is greater than the spring force exerted by the springs 250, 252, the brake pad 216b is moved away from the brake disk 212, as discussed above.

Figure 11:
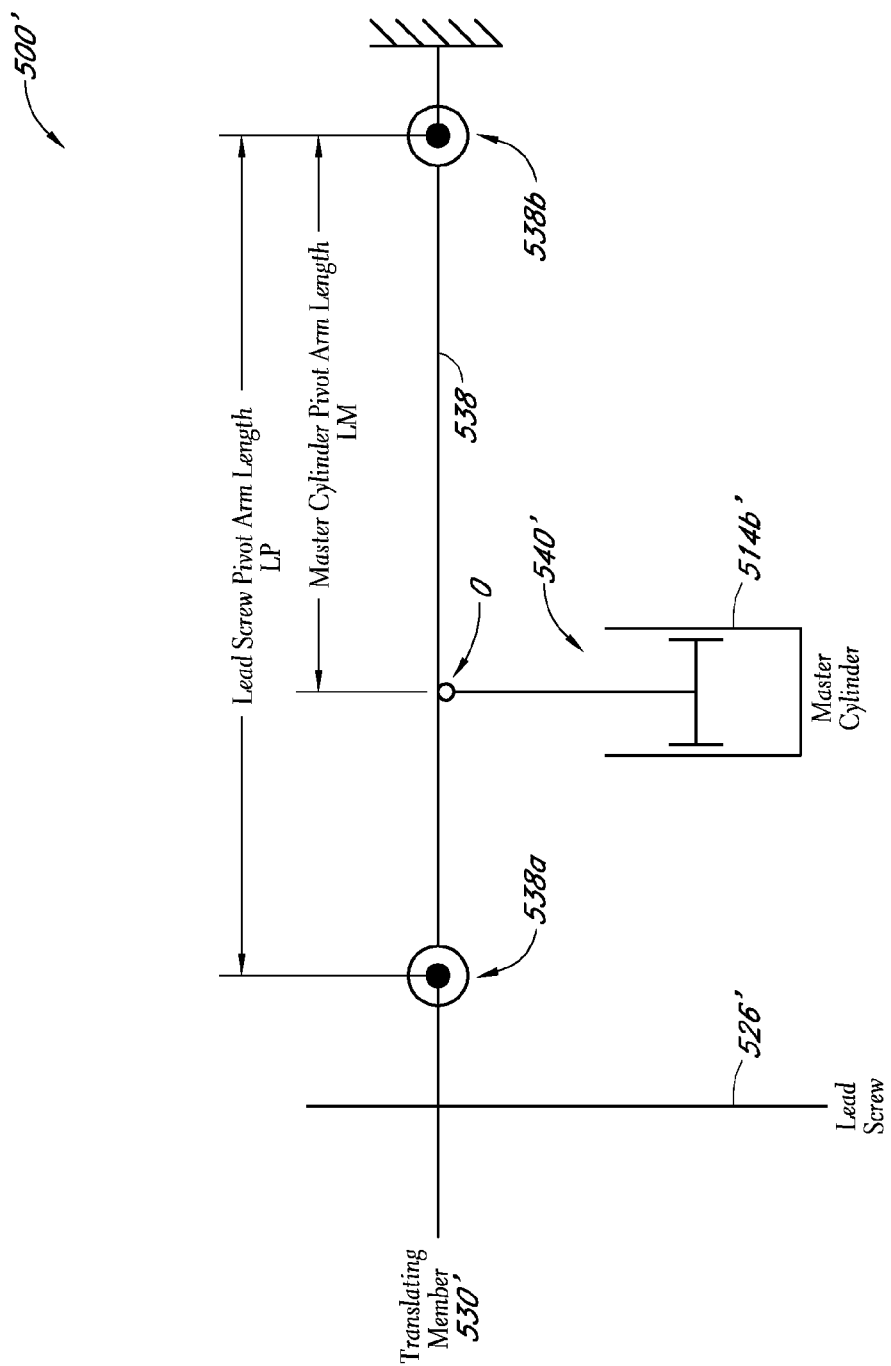
FIG. 11 is a schematic view of another embodiment of an electro-hydraulic brake actuator.

FIG. 11 illustrates another embodiment of an electro-hydraulic brake actuator 500'. The brake actuator 500' is similar to the brake actuator 500, except as noted below. Thus, the reference numerals used to designate the various components of the brake actuator 500' are identical to those used for identifying the corresponding components of the brake actuator 500 in FIGS. 4-7, except that a "'" has been added to the reference numerals. In one preferred embodiment, the layout of the brake actuator 500' can be such that the actuator 500' is housed within the envelope of the hub of a wheel, as with the brake actuator 500.

In the illustrated embodiment, the brake actuator 500' can have a lead screw 526' that can be driven (e.g., rotated) by a motor (e.g. an electric motor), such as the motor 510 described above. The lead screw 526' can be movably coupled to a translating member (e.g., a nut) 530' that translates along the lead screw 526' as the lead screw 526' rotates. The translating member 530' can be operatively coupled to one end 538a of a lever 538, which can pivot about a second end 538b thereof A piston 540' can be operatively coupled to the lever 538 at a point O intermediate the ends 538a, 538b of the lever, so that movement of the lever 538 by the translating member 530' will cause the piston 540' to be displaced along a master cylinder 514b'. A distance LM between said coupling point O of the piston 540' and the pivot end 538b of the lever 538 relative to a length LP of the lever 538 will determine the amount by which the piston 540' is displaced within the master cylinder 514b' corresponding to the amount by which the first end 538a of the lever 538 is displaced by the translating member 530'. In one embodiment, the distance LM between the coupling point O and the pivot end 538b of the lever 538 is between about 0.25 inch and about 3 inches. In another embodiment, the distance LM is between about 0.5 inches and about 2 inches. In still another embodiment, the distance LM is 0.525 inches. In one embodiment, the distance LP of the lever 538 is between about 0.5 inches and about 5 inches. In another embodiment, the distance LP is between about 0.75 inches and about 3 inches. In still another embodiment, the distance LP is about one inch.

Figure 12A:
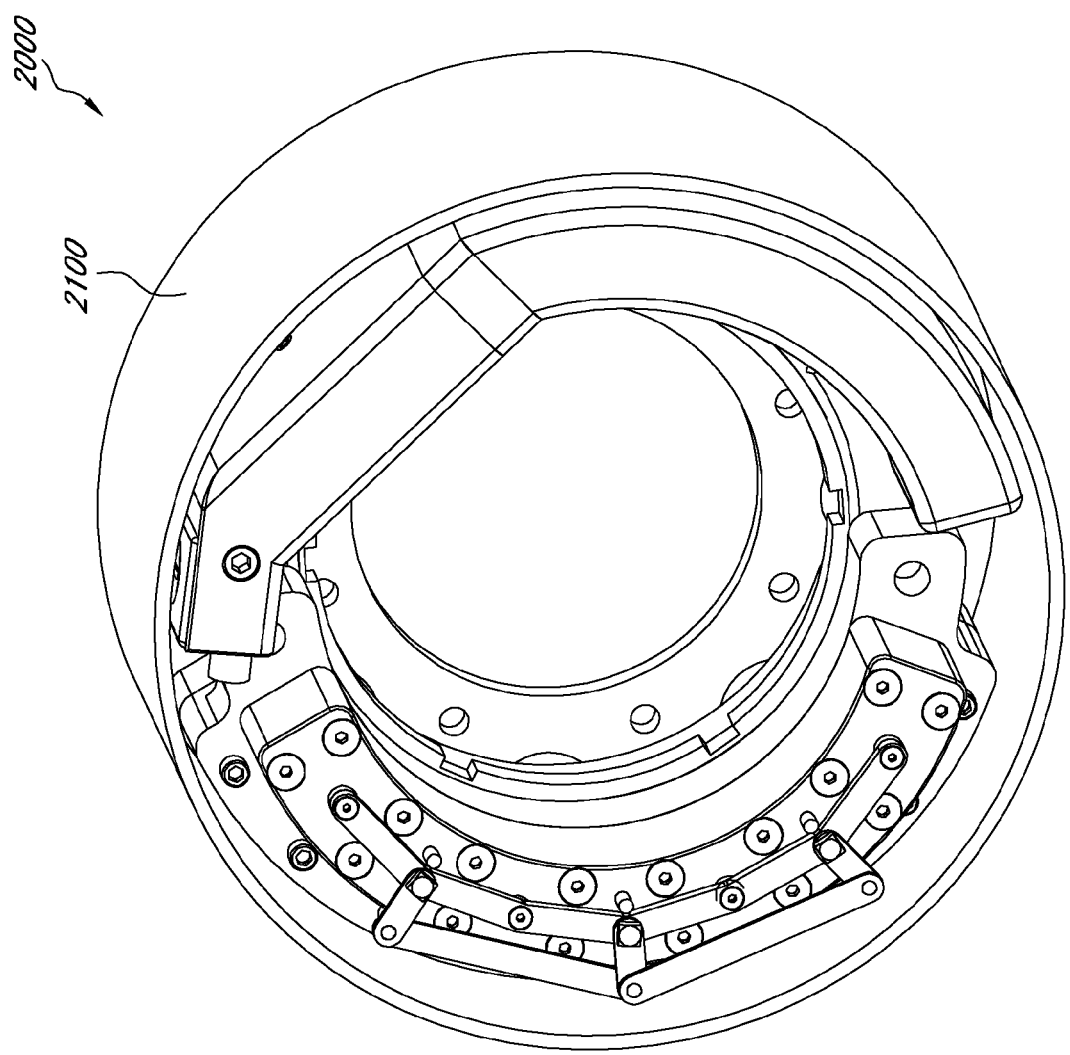
FIG. 12A is a schematic perspective view of another embodiment of an electro-hydraulic brake.

FIGS. 12A-15 illustrate another embodiment of an electro-hydraulic brake 2000. As shown in FIG. 12A, the electro-hydraulic brake 2000 can be disposed within a recessed portion of a rim 2100, which can be attached to a wheel hub of a vehicle.

Figure 12B:
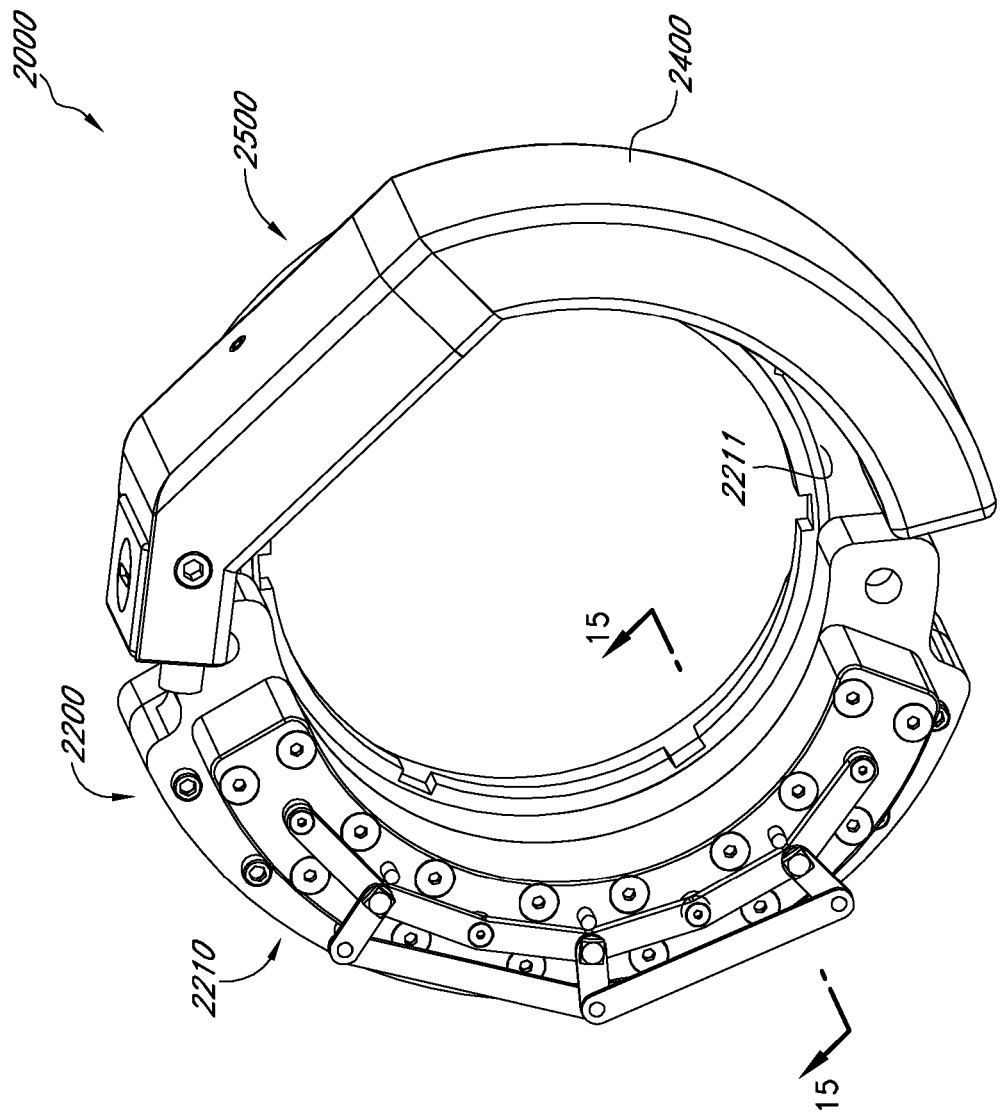
FIG. 12B is a schematic perspective view of the brake mechanism of the electro-hydraulic brake in FIG. 12A.

With reference to FIG. 12B, the electro-hydraulic brake 2000 can have a brake assembly 2200 with a caliper 2210 disposed about at least a portion of a brake disk 2211, a controller 2400 and an electro-hydraulic brake actuator 2500, which are further described below. The controller 2400 can have a generally curved contour so as to fit within the cylindrical recess of the rim 2100. Similarly, the actuator 2500 can be sized to fit within the cylindrical recess of the rim 2100.

Figure 13:
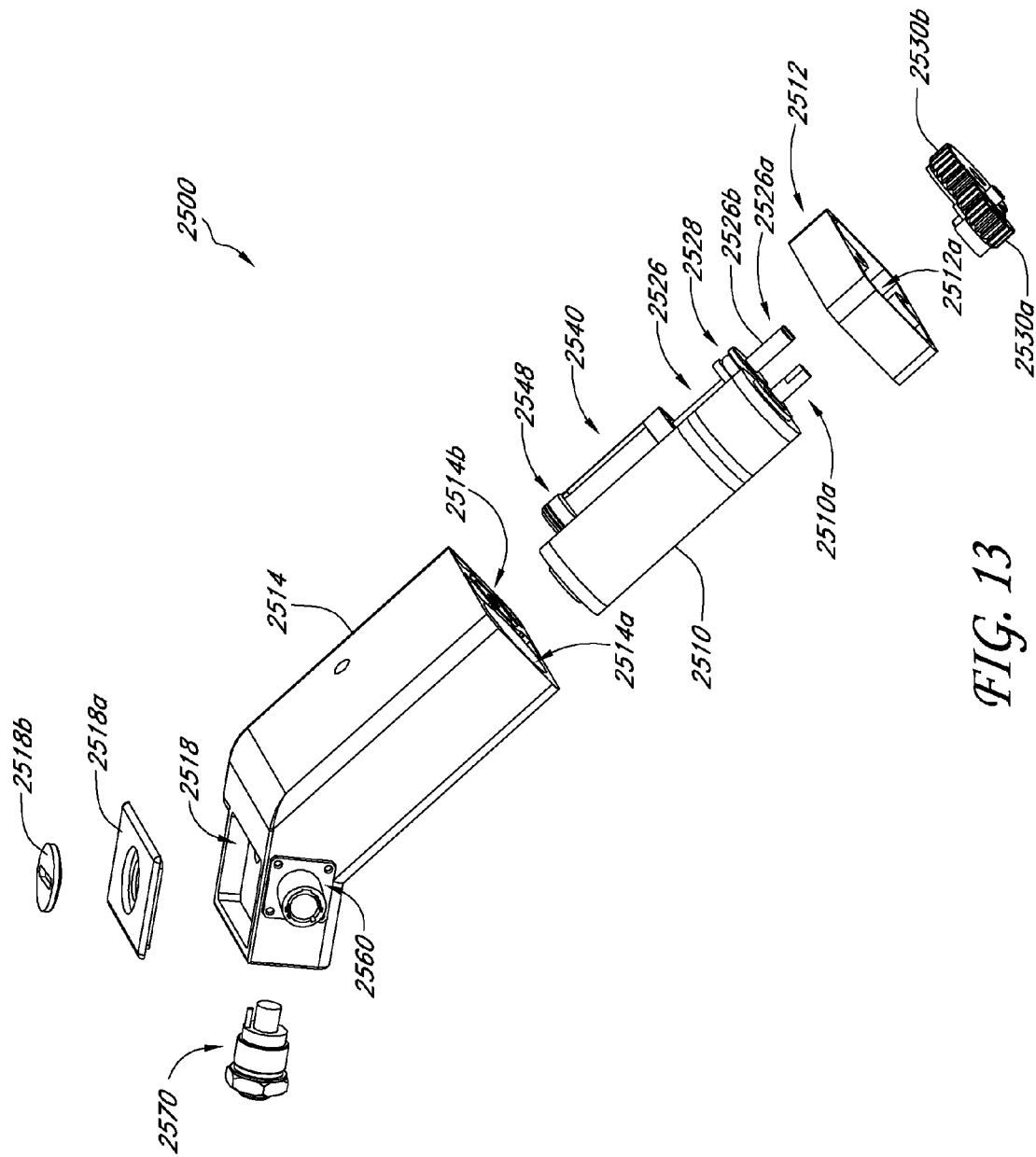
FIG. 13 is a schematic exploded view of one embodiment of a brake actuator used in the electro-hydraulic brake of FIG. 12A.

With reference to FIG. 13, the electro-hydraulic brake actuator 2500 can have a motor 2510 (e.g. a DC motor) that can be operated to turn a shaft 2510a. The shaft 2510a can extend through a support 2512 and couple to a drive gear 2530a of a gear train assembly 2530. In one embodiment, the gear train assembly 2530 can have a gear ratio of 1.5 and an efficiency of 85%. However, other gear ratios and efficiencies are possible. The gear train assembly 2530 can be at least partially disposed in a recess 2512a of the support 2512. The drive gear 2530a can be coupled to at least one driven gear 2530b, which can transfer the rotation of the shaft 2510a, at a desired gear reduction ratio, to a lead screw 2526 coupled to the driven gear 2530b, where one end 2526a of the lead screw 2526 can be coupled to the support 2512 via a bearing 2528 disposed about a shoulder portion 2526b of the lead screw 2526.

The rotation of the lead screw 2526 via the gear train 2530 in turn advances a master cylinder piston 2540, which can have at least one sealing member 2548 (e.g., O-ring) disposed within a circumferential groove of the master cylinder piston 2540.

The motor 2510 and master cylinder piston 2540 are preferably housed within corresponding bores 2514a, 2514b of an actuator housing 2514. Preferably, the bore 2514b defines a cylinder that slidingly receives the master cylinder piston 2540 with the sealing member 2548 providing a seal between the cylinder 2514b and the master cylinder piston 2540.

The actuator housing 2514 can also define a reservoir 2518 that can hold hydraulic fluid. The reservoir 2518 can have a cover 2518a for closing the reservoir 2518 and a cap 2518b for providing access to the reservoir 2518 through the cover 2518b.

An outlet connector 2560 can be coupled to the actuator housing 2514 and be in communication with the cylinder 2514b. Likewise, a bypass valve 2570 can be coupled to the actuator housing 2514 and be in communication with the cylinder 2514b and the reservoir 2518. During operation, the motor 2510 can be actuated by the controller 2400 to advance the master cylinder piston 2540 within the cylinder 2514b via the gear train 2530. The cylinder 2514b can have hydraulic fluid therein, and advancement of the master cylinder piston 2540 within the cylinder 2514b can displace the hydraulic fluid within the cylinder 2514b and out of the connector 2560 to generate hydraulic pressure. At least one hydraulic line (not shown) can be coupled to the connector 2560 and to hydraulic cylinders in the brake assembly 2200, so that the hydraulic pressure generated by the advancement of the master cylinder piston 2540 can be transferred to the hydraulic cylinders. As discussed above, in the event of an emergency, the bypass valve 2570 can be actuated by the controller 2400 to allow flow of hydraulic fluid from at least one of the hydraulic line and cylinder 2514b into the reservoir 2518, thereby reducing the hydraulic pressure applied to the hydraulic cylinders of the brake assembly 2200 and allowing brake pads coupled to the caliper 2210 to engage the brake disk 2211 and apply a braking force thereto.

Figure 14:
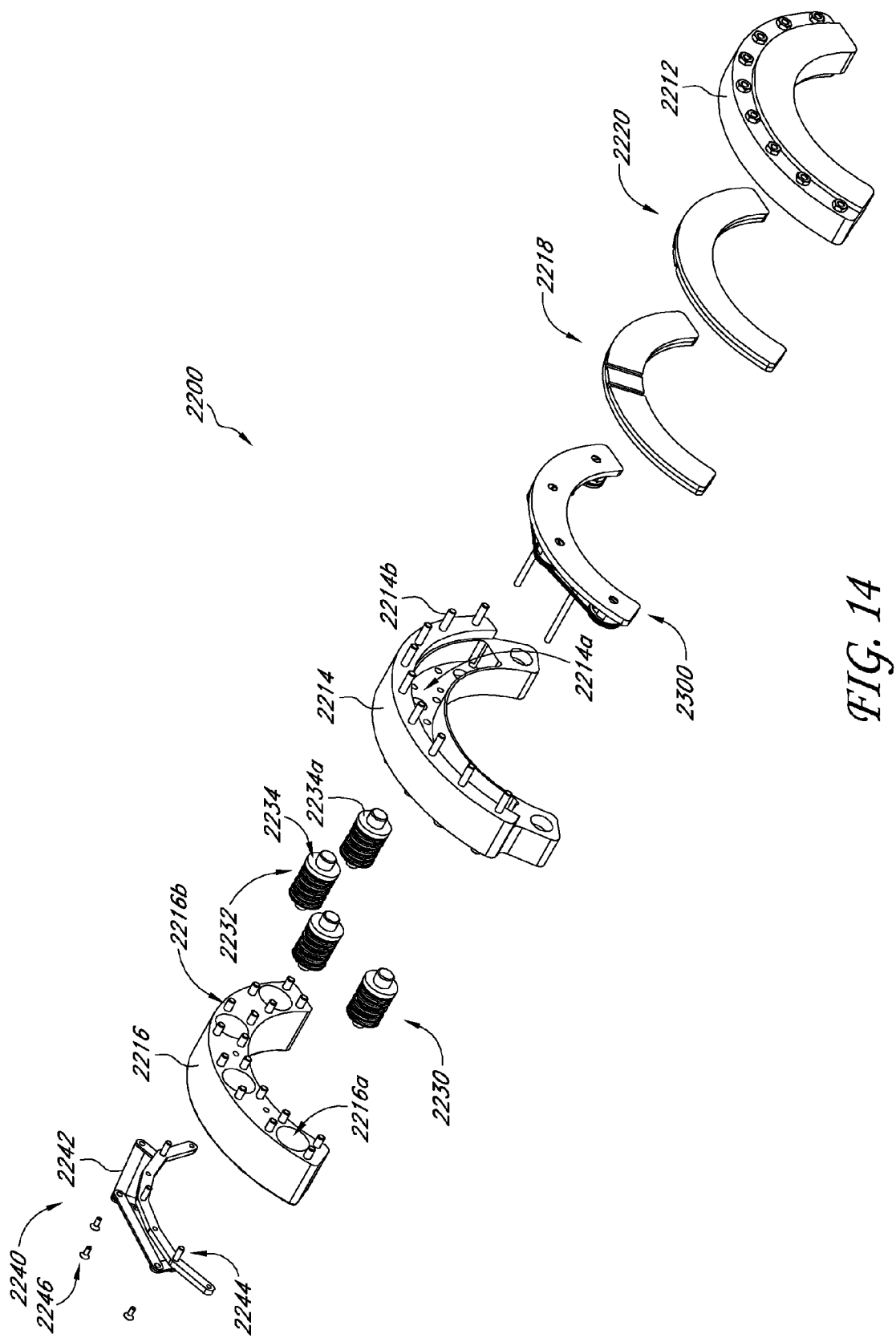
FIG. 14 is a schematic exploded view of one embodiment of a brake assembly used in the electro-hydraulic brake of FIG. 12A.

FIG. 14 shows an exploded view of the brake assembly 2200. As discussed above, the brake assembly 2200 has a caliper body 2210 that can include a first section 2212, a second section 2214 and a third section 2216 coupleable to each other. For example, as shown in FIG. 14, the third section 2216 can be at least partially coupled to the second section 2214 via fasteners (e.g., pegs) 2216b on the third section 2216 sized to extend into corresponding bores (not shown) on the second section 2214. Similarly, fasteners 2214b can be used to fasten the second section 2214 to the first section 2212 of the caliper body 2210.

First and second brake pads 2218, 2220 can be disposed on either side of the brake disk 2211 (see FIGS. 12B and 15) and between the first and second sections 2212, 2214 of the caliper body 2210. A wear auto compensation mechanism 2300, which is further described below, can be disposed in a recessed section 2214a of the second section 2214 of the caliper 2210 and between the second section 2214 and the first brake pad 2218.

The brake assembly 2200 can also have at least one hydraulic piston 2234. In the illustrated embodiment, the brake assembly 2200 has four hydraulic pistons 2234. However, in other embodiments, the brake assembly can have more or fewer hydraulic pistons. Each hydraulic piston 2234 can have a shaft body 2234b extending between a proximal end 2234c and a distal end 2234d. The hydraulic piston 2234 can also have a flange portion 2234a that extends outward from the shaft body 2234b.

The hydraulic pistons 2234 can be disposed between the second and third sections 2214, 2216 of the caliper body 2210, with the hydraulic pistons 2234 slidingly disposed within cylindrical bores 2216a defined in the third portion 2216 of the caliper body 2210. Additionally, each of the hydraulic pistons 2234 of the brake assembly 2200 can have a spring 2232 disposed about the shaft body 2234b such that the spring 2232 extends between a closed end of the cylindrical bore 2216a and the flange portion 2234a of the hydraulic piston 2234. A suitable spring 2232 is Model No. 9-2408-36 from Danly with a minimum spring load of about 975 lbf and a load at maximum deflection of about 1220 lbf.

In the illustrated embodiment, the brake assembly 2200 can also have a manual release assembly 2240, which can have a linkage assembly 2242 that can be attached to the third portion 2216 of the caliper body 2210 via at least one fastener 2244 (e.g., screw, bolt, etc.) that can be driven into contact with the third portion 2216 of the caliper body 2210. Additionally, at least one fastener 2246 (e.g., screw, bolt, etc.) can also be used to fasten the linkage assembly 2242 to the proximal ends 2234c of the hydraulic pistons 2234.

The manual release mechanism 2240 can be actuated to move the hydraulic pistons 2234 toward the disk brake 2211, thereby moving the brake pads 2218, 2220 into engagement with the brake disk 2211. An operator can rotate at least one of the fasteners 2244 so that the fastener 2244 pushes against the third portion 2216 of the caliper body 2210 and pulls the hydraulic piston 2234 away from the second section 2214. This movement of the hydraulic piston 2234 results in the compression of the spring 2232 and the movement of the brake pad 2218 away from the brake disk 2211 to release the brake. Likewise, to manually engage the brake, the operator can rotate the fastener 2244 in the opposite direction so that the fastener 2244 withdraws from contact with the third portion 2216 of the caliper body 2210. This causes the spring force of the spring 2232 to push the hydraulic piston 2234 toward the second portion 2214, thereby moving the brake pad 2218 into engagement with the brake disk 2211 to engage the brake. In one embodiment, the pitch of the screw 2244 is designed such that a partial turn of the screw 2244 generates the necessary gap between the brake pad 2218 and the disk brake 2211 to release the brake regardless of the wear status of the brake.

Figure 15:
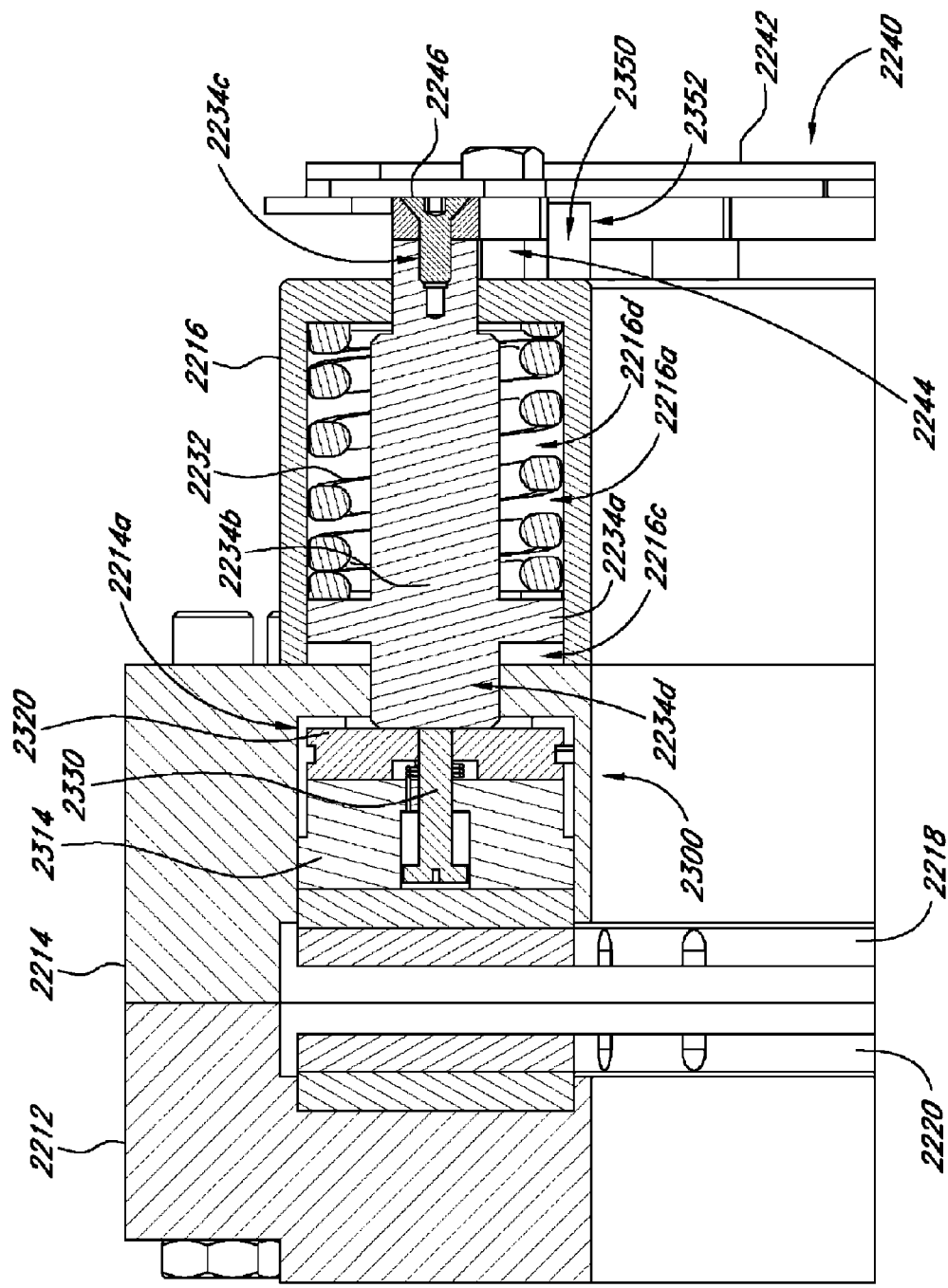
FIG. 15 is a schematic cross-sectional view of the electro-hydraulic brake mechanism of FIG. 12B along line 15-15.

With continued reference to FIG. 15, the spring 2232 applies a force onto the piston body 2234b that urges the piston body 2234b in the direction of engagement with the wear auto compensation mechanism 2300, which in turn transfers said force onto the brake pad so as to apply a braking force onto the brake disk 2211. The brake actuator 2500 can be actuated by the controller 2400, as described above, to cause an increase in hydraulic pressure in the hydraulic line, which can be in fluid communication with a hydraulic chamber 2216c defined in the cylindrical bore 2216a between the flange 2234a of the hydraulic piston 2234 and the second portion 2214 of the caliper 2210. An increase in hydraulic pressure generated by the brake actuator 2500 preferably delivers more hydraulic fluid into the hydraulic chamber 2216c, thereby applying a hydraulic force on the flange 2234a of the hydraulic piston 2234 in a direction opposite to the spring force exerted by the spring 2232. Therefore, the default mode of operation for the electro-hydraulic brake 2000 is to engage the brake 2000. To disengage the brake 2000, the controller 2400 operates the brake actuator 2500 to increase the hydraulic pressure in the hydraulic chamber 2216c within the cylindrical bore 2216a in order to move the hydraulic piston 2234, and thereby the brake pads 2218, 220 away from the brake disk 2211. Advantageously, if there is a loss of hydraulic pressure in the hydraulic line, the default operation of the electro-hydraulic brake 2000 is to engage the brake pads 2218, 2220 via the spring force to engage the brake. Additionally, in the event of an emergency, such as the loss of power, the controller 2400 can operate the bypass valve 2570 to direct hydraulic fluid to the reservoir 2518, thereby reducing the hydraulic pressure in the hydraulic chamber 2216c and allowing the spring 2232 to urge the brake pads 2218, 2220 into engagement with the brake disk 2211.

Figure 16:
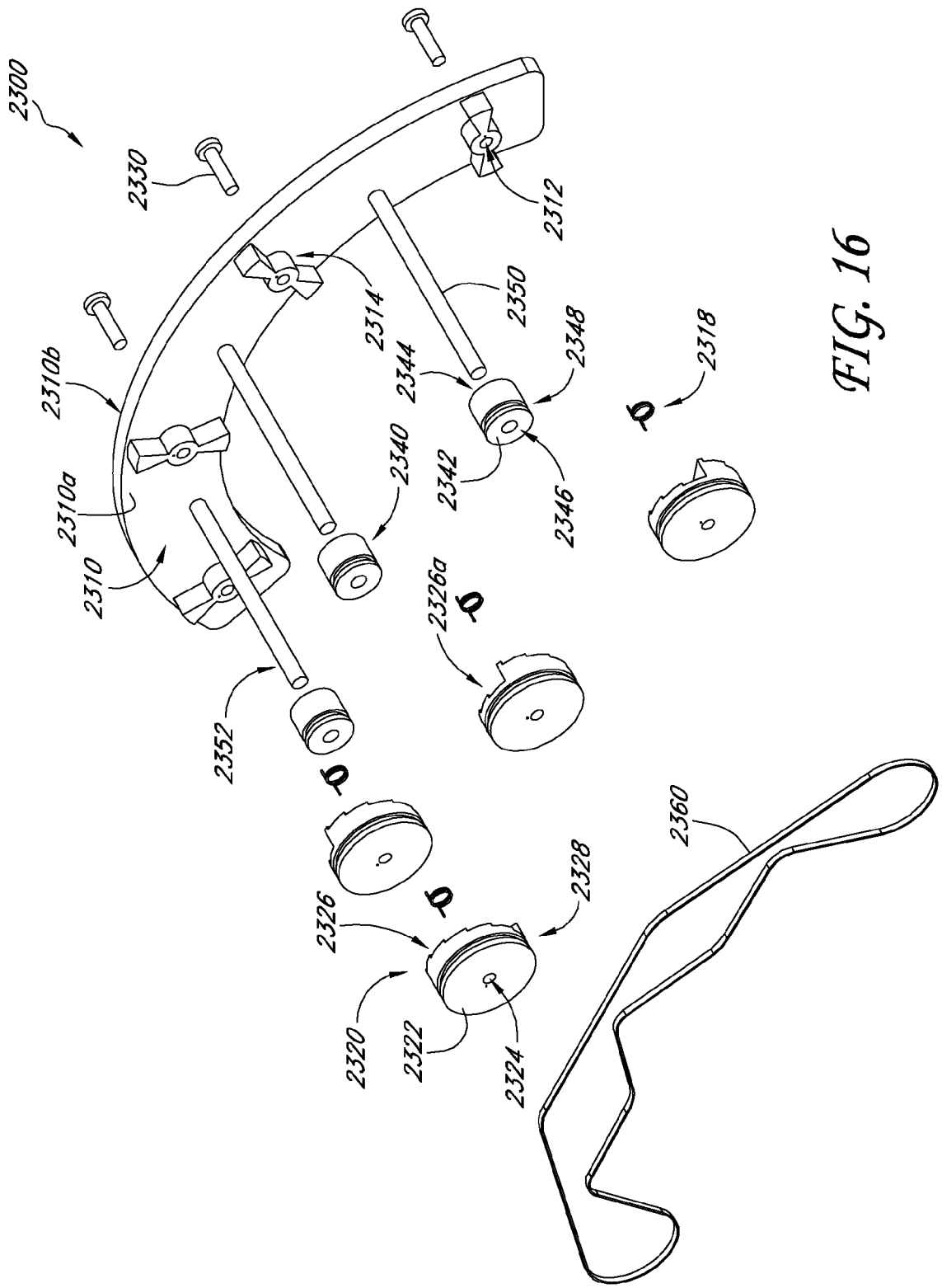
FIG. 16 is a schematic perspective exploded view of a mechanical wear compensation system for use with the electro-hydraulic brake of FIG. 12A.

FIG. 16 shows the mechanical wear compensation mechanism 2300. The wear compensation mechanism 2300 can include a push plate 2310 having a first side 2310a and an opposite second side 2310b. In one embodiment, the brake pad 2218 is attached to the second side 2310b of the push plate 2310. At least one bore 2312 is defined through the push plate 2310, each bore 2312 extending through the push plate 2310 and through a corresponding torsion support member 2314 on the first side 2310a of the push plate 2310. A torsion and compression spring 2318 can be disposed over a corresponding torsion support member 2314 and in alignment with the bore 2312 extending through the torsion support member 2314.

A wear compensator 2320 can be movably coupled to the torsion support member 2314 with the torsion and compression spring 2318 disposed therebetween. The wear compensator 2320 can have a generally flat surface 2322 that can come in contact with the distal end 2234d of the hydraulic piston 2234 (see FIG. 15). A bore 2322 is preferably formed through the wear compensator 2320 and aligns with the bore 2312 and torsion and compression spring 2318 when the wear compensator is disposed on the torsion support member 2314. Additionally, the wear compensator 2320 also preferably has a stepped bottom surface 2326 that faces the torsion support member 2314 when the wear compensator 2320 is disposed thereon, and a recess 2326a into which the torsion and compression spring 2318 can extend. Further, the wear compensator 2320 can have a circumferential groove 2328 formed on a cylindrical surface thereof.

A fastener 2330 can be inserted through the push plate 2310 and extend through a corresponding bore 2312, torsion support 2314, torsion and compression spring 2318 and wear compensator 2320, as shown in FIG. 15.

With continued reference to FIG. 16, the wear compensation mechanism 2300 can have at least one idler member 2340 with a top surface 2342 and an opposite bottom surface 2344. In one embodiment, a bore 2346 extends through the idler member 2340 and a groove 2348 extends circumferentially around the idler member 2340. The idler member 2340 can be rotatingly coupled to a corresponding wear indicator shaft 2350, wherein the wear indicator shaft 2350 extends through the bore 2346 of the idler member 2340. When the brake assembly 2200 is assembled (see e.g., FIG. 15), the bottom surface 2344 of the idler member 2340 can contact the first side 2310a of the push plate 2310, and the top surface 2342 of the idler member 2340 can contact a recessed surface 2214a of the second section 2214 of the caliper 2210. An end portion 2352 of the wear indicator shaft 2350 can extend outward from the third section 2216 of the caliper body 2210 and advantageously provide an indication of the thickness (e.g., wear) of the brake pad 2218. In one embodiment, the end portion 2352 can have gradations or other markings to indicate the remaining thickness of the brake pad 2218.

A belt 2360 can be disposed within the grooves 2328, 2348 of the wear compensator 2320 and idler member 2340, respectively, thereby interconnecting the at least one wear compensator 2320 and at least one idler member 2340. Accordingly, rotation of one of the wear compensators 2320 and idler members 2340 can effect the rotation of the rest of the wear compensators 2320 and idler members 2340.

The mechanical wear compensation mechanism 2300 can be actuated to advantageously adjust the position of the brake pad 2218 relative to the brake disk 2211 to account for wear in the brake pad 2218. For example, with the brake assembly 2200 in the disengaged position, the wear compensator 2320 can be rotated, thereby rotating the remaining wear compensators 2320 and idler members 2340, so that the brake pad 2318 is moved into contact with the brake disk 2211 via the engagement of the steeped bottom surface 2326 with the torsion support member 2314. The controller 2400 can then operate the brake actuator 2500 to move the brake pad 2218 (via delivery of hydraulic fluid into the hydraulic chamber 2216c to move the hydraulic piston 2234) away from the brake disk 2211 until a signal from a brake force sensor (not shown) indicates a zero force exerted by the brake pad 2218 onto the brake disk 2211, said position of the brake pad 2218 becoming the starting position for the brake pad 2218 in a disengaged state. The brake assembly 2200 can thereby be regularly adjusted to ensure the position of the brake pads 2218, 2220 relative to the brake disk 2211 is regularly adjusted to account for wear of the brake pads 2218, 2220.

Figure 17:
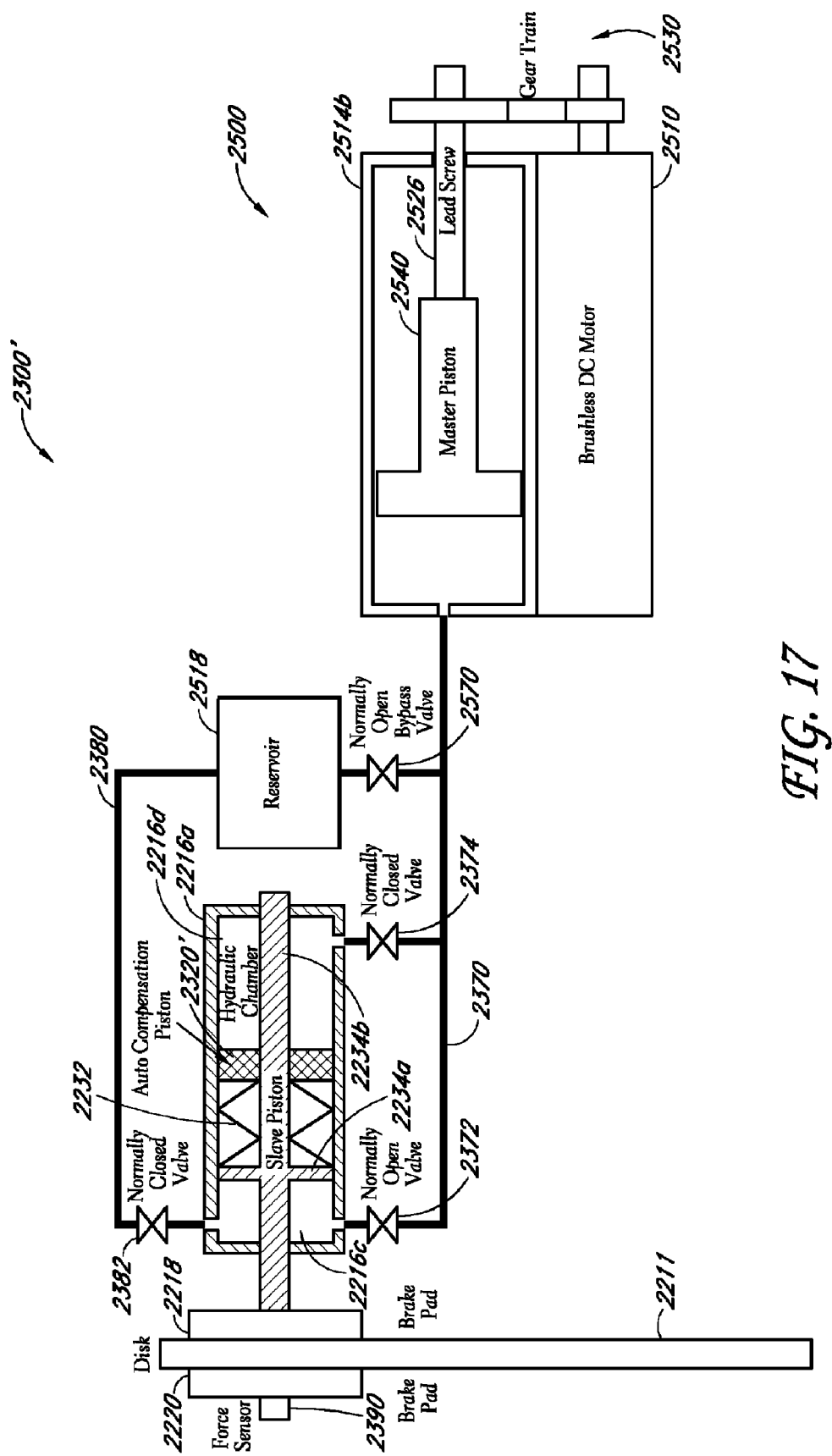
FIG. 17 is a schematic view of a hydraulic wear compensation system for use with the electro-hydraulic brake of FIG. 12A.

FIG. 17 shows another embodiment of a wear compensation mechanism 2300'. The wear compensation mechanism 2300' is similar to the wear compensation mechanism 2300, except as noted below. Thus, the reference numerals used to designate the various components of the wear compensation mechanism 2300' are identical to those used for identifying the corresponding components of the wear compensation mechanism in FIG. 16, except that a "'" has been added to the reference numerals.

In the illustrated embodiment, the wear compensation mechanism 2300' is a hydraulic system and includes a compensation piston 2320' disposed within the cylindrical bore 2216a of the third section 2216 of the caliper body 2210 and slidingly coupled to the shaft body 2234b of the hydraulic piston 2234, with the spring 2232 disposed between the flange portion 2234a and the compensation piston 2320'. A second hydraulic chamber 2216d is defined between the compensation piston 2320' and the closed end of the cylindrical bore 2216a in the third section 2216 of the caliper body 2210. A hydraulic line 2370 can connect the hydraulic cylinder 2514b with the first and second hydraulic chambers 2216c, 2216d via valves 2372, 2374, respectively. The hydraulic line 2370 can also communicate the hydraulic cylinder 2514b with the bypass valve 2570 and reservoir 2518. In the illustrated embodiment, the valve 2372 in communication with the first hydraulic chamber 2216c can be in a normally open position and the valve 2374 in communication with the second hydraulic chamber 2216d can be in a normally closed position. The hydraulic wear compensation mechanism 2300' can also have a second hydraulic line 2380 that couples the reservoir 2518 to the first hydraulic cylinder 2216c via a valve 2382 that is in a normally closed position. In the illustrated embodiment, the bypass valve 2570 is in a normally open position.

In operation, the valves 2374, 2382 can be closed and hydraulic fluid delivered into the first hydraulic cylinder 2216c via the advancement of the master piston 2540 within the hydraulic cylinder 2514b, as described above. The flow of hydraulic fluid into the first hydraulic chamber 2216c exerts a hydraulic force onto the flange 2234a of the hydraulic piston 2234 to move the piston 2234 in a direction opposite to a force exerted by the spring 2232 and thereby move the brake pad 2218 away from the brake disk 2211. To adjust the position of the brake pad 2218 relative to the brake disk 2211 to compensate for wear, the valve 2372 can be closed, the valve 2382 can be opened, and the valve 2374 can be opened. Additionally, the bypass valve 2570 can be closed. Therefore, advancement of the master piston 2540 within the hydraulic cylinder 2514b causes hydraulic fluid to flow into the second hydraulic chamber 2216d, thereby advancing the compensation piston 2320' toward the flange 2234a of the hydraulic piston 2234. The advancement of the compensation piston 2320' exerts a force on the spring 2232, which transfers the force to the flange 2234a, thereby moving the hydraulic piston 2234 toward the brake pad 2218. Hydraulic fluid in the first hydraulic chamber 2216c exits via the valve 2382 and hydraulic line 2380 back into the reservoir 2518. Once the controller 2400 receives a signal from a force sensor 2390 that the brake pad 2218 is in engagement with the brake disk 2211, the valves 2382, 2374 can be closed and the valve 3272 can be opened. The brake actuator 2500 can then be actuated to deliver hydraulic fluid into the first hydraulic chamber 2216c to thereby move the hydraulic piston 2234 toward the compensation piston 2320', which compresses the spring 2232 therebetween, until the force sensor 2390 registers a zero force indicating the disengagement of the brake pad 2218 from the brake disk 2211. Said position of the brake pad 2218 can then be used as the starting point for actuating the movement of the brake pad 2218 via the brake actuator 2500.

Figure 18:
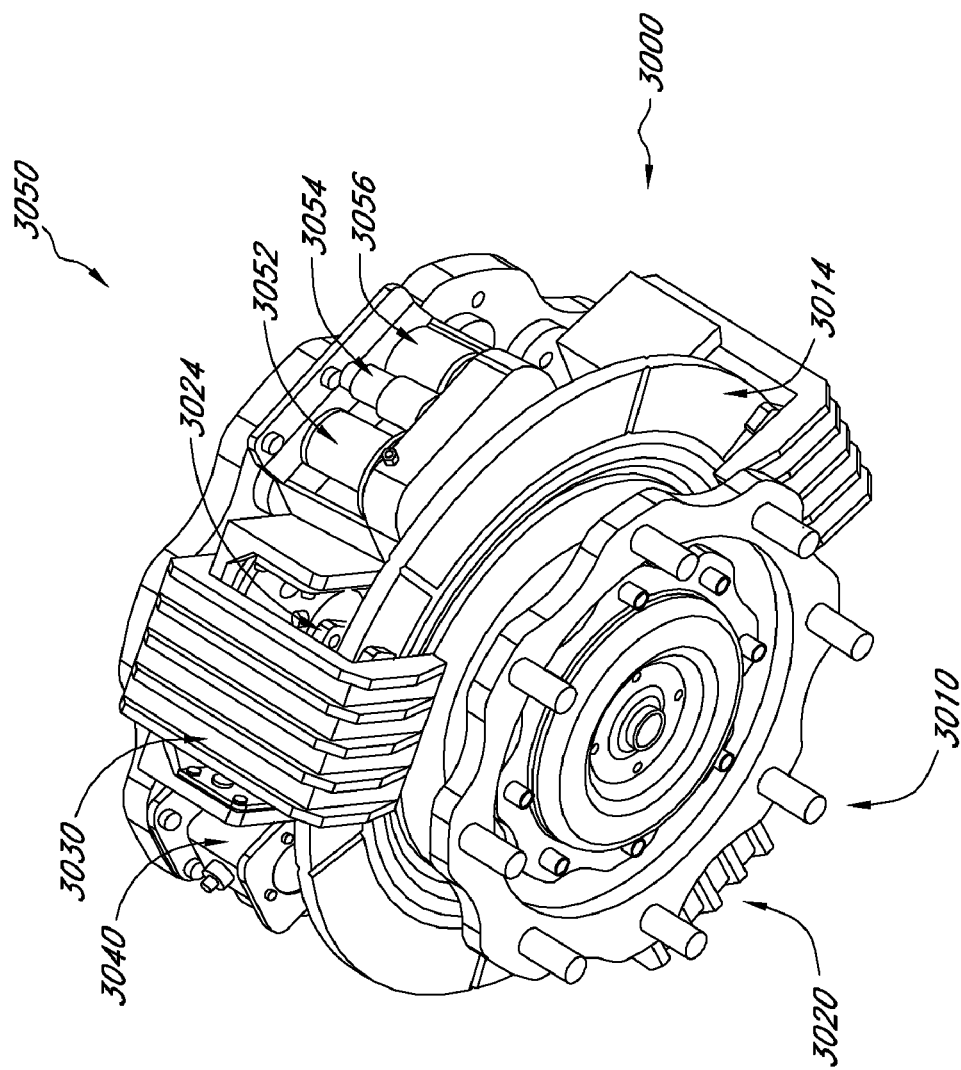
FIG. 18 is a schematic perspective view of another embodiment of an electro-hydraulic brake.

FIG. 18 shows another embodiment of an electro-hydraulic brake 3000. In the illustrated embodiment, the brake 3000 includes a hub 3010 for attaching a wheel (not shown) to the brake 3000, a brake disk 3014 and a brake caliper 3020. In the illustrated embodiment, the brake caliper 3020 consists of three separate calipers arranged at different locations around the brake disc 3014. However, one of ordinary skill in the art will recognize that the number of calipers 3020 about the circumference of the brake disk 3014 can be more or fewer than the three shown in FIG. 18

The electro-hydraulic brake 3000 in FIG. 18 can also include a hydraulic actuator 3030, associated with each caliper 3020. The hydraulic actuator 3030 can have a configuration similar to the hydraulic piston-cylinder arrangement described in the embodiments above. In one embodiment, a spring (not shown) associated with each caliper 3020 urges a brake pad 3024 toward the brake disk 3014 to engage the brake 3000. The hydraulic actuator 3030 can apply a force on the brake pad 3024 in a direction opposite the spring force to maintain the brake 3000 in a disengaged state until a brake controller 3040, which controls the operation of the hydraulic actuator 3030, receives a brake signal.

In the illustrated embodiment, the brake controller 3040 preferably controls the operation of an actuation mechanism 3050 that can include a motor pump 3052, a pressure transducer 3054 and a reservoir 3056 of hydraulic fluid. The pressure transducer 3054 can receive a signal from a user corresponding to a brake command. For example, the pressure transducer 3054 can be connected to a brake pedal of a vehicle so as to sense a brake command from a user operating the vehicle. A pressure signal generated by the pressure transducer 3054 can be transmitted to the brake controller 3040, where the brake command can be converted into a motor pump actuator command using, for example, the algorithm in FIG. 19 discussed below.

The brake controller 3040 can then transmit the motor pump actuator command to the motor pump 3052 to pump hydraulic fluid from the reservoir 3056 to the hydraulic actuator 3030 in order to apply a hydraulic force on the brake pad 3024 to move the brake pad 3024 to a position corresponding to the motor pump actuator command.

In one embodiment, a bypass valve (not shown) can be provided in the hydraulic line between the motor pump 3052 and the hydraulic actuator 3030 in order to allow bleeding of the hydraulic fluid from the hydraulic line and back into the reservoir 3056 in an emergency (e.g., loss of electric power or loss of hydraulic pressure, thereby allowing the spring force to move the brake pad 3024 into engagement with the brake disc 3014. Accordingly, the illustrated brake 3000 has a fail safe mode in which the brake 3000 is engaged if, for example, there is a loss of hydraulic pressure or electric power in the system.

In the illustrated embodiment, the motor pump 3052 can be a G-rotor pump, as is known in the art. However, the motor pump 3052 can be other suitable pump types, such as a positive-displacement pump.

The electro-hydraulic brake 3000 in FIG. 18 does not show the hydraulic lines interconnecting the reservoir 3056 to the motor pump 3052 or the motor pump 3052 o the hydraulic actuator 3030, though one of ordinary skill in the art will recognize that said brake lines can be any suitable hydraulic fluid tubing used in conventional hydraulic brake systems.

Figure 19:
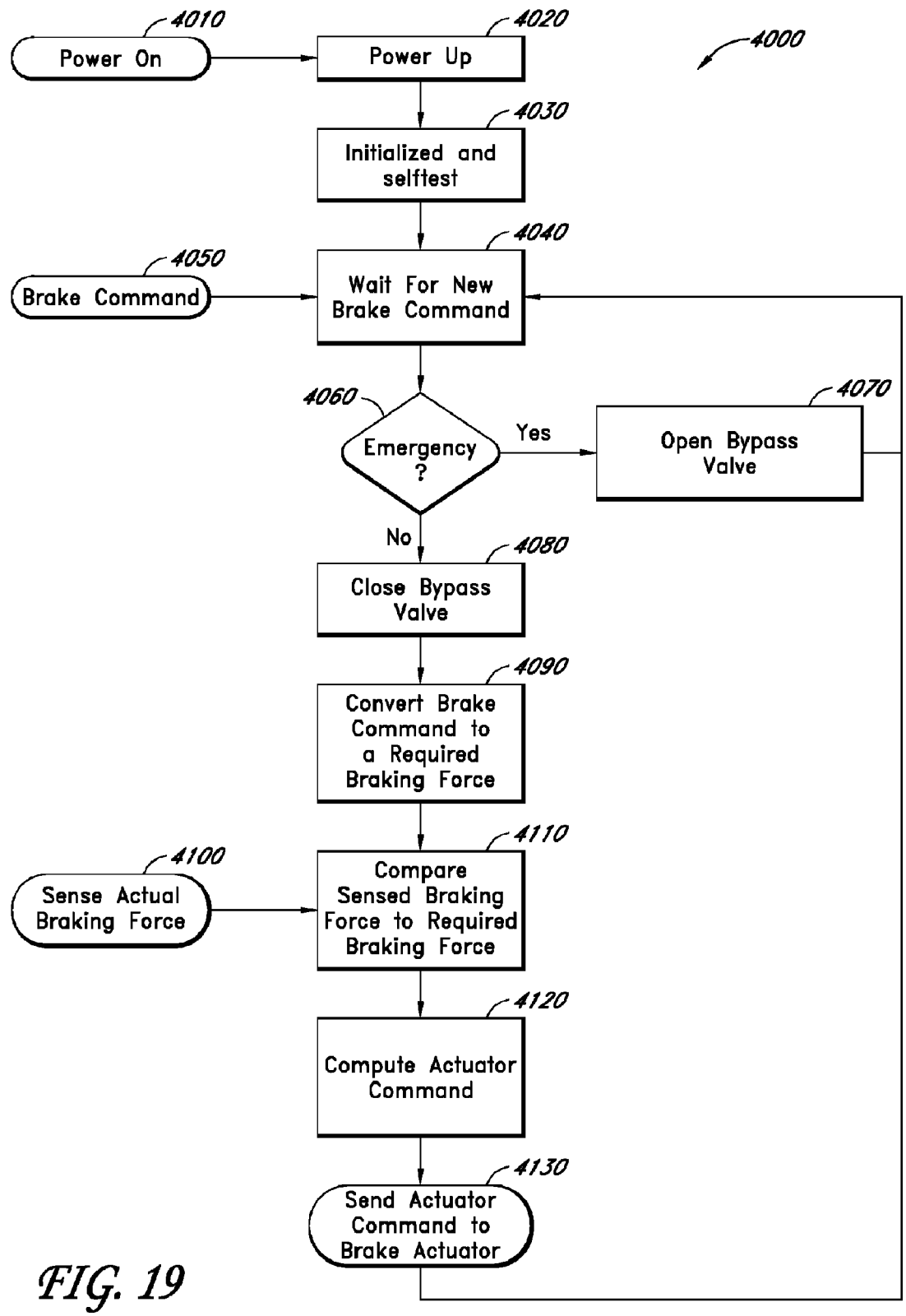
FIG. 19 is a block diagram of one embodiment of a method for operating an electro-hydraulic brake actuator.

FIG. 19 illustrates one embodiment of a method 2000 for operating an electro-hydraulic brake actuator, such as the brake actuator 500. Though the method in FIG. 19 will be described with respect to the brake 1000 and brake actuator 500, 500' in FIGS. 1-18, one of ordinary skill in the art will recognize that the method 2000 can be employed by the other brake and actuator embodiments disclosed herein.

The method 4000 includes turning a switch (not shown) to the ON position 4010 to provide power to the controller 400, 2400, 3040. For example, a main switch of a vehicle can be moved to the ON position to provide power to the controller 400, 2400 ,3040 from, for example, a battery. With the switch in the ON position 4010, a power up signal 4020 is provided to the controller 400, 2400, 3040. The controller 400, 2400, 3040 and brake actuator 500, 500', 3030 can then be initialized and a self test process run 4030. The controller 400, 2400, 3040 then waits 4040 for a brake command. When the controller 400, 2400, 3040 receives the brake command 4050 (e.g., from a user pressing down on a brake pedal of a vehicle), the controller 400, 2400, 3040 determines if there is an emergency 4060. If there is an emergency, the controller 400, 2400, 3040 can open 4070 the bypass valve 570, 2570 to allow hydraulic fluid in the cylinder 514b, 2514b and hydraulic line to flow into the reservoir 518, 2518, which in turn reduces the hydraulic force on the pistons 536a-c and allows the springs 250, 252, 2232 to overcome the hydraulic force and urge the brake pad 216b, 2218 into engagement with the brake disk 212, 2212. The controller 400, 2400, 3040 can determine that there is an emergency by, for example, determining that there is a loss of power, determining that there is a loss of hydraulic pressure in the cylinder 514b, 2514b and/or hydraulic line, or determining that a force corresponding to the brake command 4050 is greater than a predetermined (e.g., preset) force amount.

If the controller 400, 2400, 3040 determines that there is not an emergency, the controller 400, 2400, 3040 can close 4080 (or maintain closed) the bypass valve 570, 2570. The controller 400, 2400, 3040 can then convert 4090 the brake command 4050 into a required braking force amount. The controller 400, 2400, 3040 can sense 4100 the actual braking force corresponding to the brake command (e.g., by measuring the force with which the user is pressing down on the brake pedal of the vehicle) and compare 4110 the sensed braking force with the calculated required braking force and compute 4120 an actuator command corresponding to the difference between the sensed braking force and the calculated required braking force. The controller 400, 2400, 3040 can communicate 4130 the actuator command to the brake actuator 500, 500', 3030 to, for example, operate the motor 510, 2510, as described above to effect the translation of the master piston 540, 540', 2540 to change the hydraulic pressure in the hydraulic line and hydraulic force exerted on the pistons 536a-c to thereby adjust the position of the brake pads 216a, b, 2218, 2220 relative to the brake disk 212, 2211.

In certain embodiments disclosed above, the motor 510, 2510 can be a 28V, 62W DC motor that operates at about 2 Amps. On suitable motor is Model No. BLWRPG173S-24V-4200 by Anaheim Automation of Anaheim, Calif. Preferably, the motor 510, 2510 operates at 2 Amps or less to hold the brake 100, 1000, 2000 in a disengaged position and operates at 6 Amps or less during a transient operation of 200 ms or less. In one embodiment, the motor 510, 2510 can have a gear head with a gear ratio of about 15 and an efficiency of about 75%, such as Model No. R15 by Anaheim Automation. In another embodiment, the motor 510, 2510 can have a gear head with a gear ratio of about 19 and an efficiency of about 75%, such as Model No. R19 by Anaheim Automation.

In certain embodiments discussed above, the brake 100, 1000, 2000 can preferably fully engage the brake in 100 ms or less and can fully disengage the brake in 200 ms or less. Additionally, in certain embodiments, the brake 100, 1000, 2000 preferably weighs 10 lbs or less.

The lead screw 526, 526', 2526 in the embodiments above can have a diameter of between about ⅛ inches and about ⅞ inches and a length of between about 0.5 inches and about 4 inches. In one embodiment, lead screw 526, 526', 2526 can have a diameter of about ⅝ inch and a length of about 1.4 inches. In another embodiment, the lead screw 526, 526', 2526 can have a diameter of about ⅝ inch and a length of about 3.2 inches. In still another embodiment, the lead screw 526, 526', 2526 can have a diameter of about ⅜ inches and a length of about 1.9 inches. On suitable lead screw is Model No. LST-062-0250Y006 by Haydon.

The master cylinder 514b, 514b', 2514 in the embodiments above can have a stroke hydraulic volume of between about 0.03 in3 and about 0.2 in3 and a total hydraulic volume of between about 0.5 in3 and about 2 in3. In another embodiment, the master cylinder 514b, 514b', 2514 can have a stroke volume of between about 0.05 in3 and about 0.1 in3 and a total hydraulic volume of between about 0.9 in3 and about 1.6 in3. The master hydraulic piston 540, 540', 2540 can have a diameter of between about 0.25 in and about 2 inches, more preferably between about 0.5 inches and about 1.25 inches. The master hydraulic piston 540, 540', 2540 can also have a total travel of between about 0.5 inches and about 6 inches with a clearance of between about 0.02 inches and about 0.5 inches, more preferably between about one inch and about 5 inches with a clearance of between about 0.05 inches and about 0.3 inches. In certain embodiments disclosed above, the master hydraulic piston 540, 540', 2540 can provide a hydraulic force of between about 300 lbf and about 2000 lbf, more preferably between about 450 lbf and about 1900 lbf.

In certain embodiments disclosed above, the brake actuator 500, 500', 2500 can preferably generate a force of up to about 3900 lbf, which can be transferred by the brake pads onto the brake disk, 212, 2212.

In certain embodiments disclosed above, the controller 400, 2400, 3040 can include a processor for processing information. In one embodiment, the controller 400, 2400, 3040 can also include a memory, such as a random access memory (RAM) or other dynamic storage device, for storing information and instructions to be executed by the processor, such as the method 4000 in FIG. 18. In another embodiment, the memory can be provided outside the controller 400, 2400, 3040 (e.g., on a vehicle with said electro-hydraulic brake 1000, 2000, 3000) and electrically connected to the controller 400, 2400, 3040. In another embodiment, the controller 400, 2400, 3040 can also include a read only memory (ROM) or other static storage device for storing static information and instructions provided for the processor. In still another embodiment, the controller 400, 2400, 3040 can be in communication with a computer on a vehicle, wherein the computer can store and provide instructions, such as the method of FIG. 18, to the controller 400, 2400, 3040. In one embodiment, the computer can be hardwired to the controller 400, 2400, 3040. In another embodiment, the controller can receive instructions (e.g., from a computer on the vehicle on which the bake 1000, 2000, 3000 is stored) wirelessly (e.g., via an RF signal).

In certain embodiments, the brake 1000, 2000, can have a manual brake release 240, 2240. In another embodiment, the manual brake release can include a hydraulic manual brake release, where a manual master cylinder piston can be incorporated into the Hydraulic circuit in parallel with the electric master cylinder. The manual master cylinder can be used to generate the necessary hydraulic pressuer to compress the spring and release the brake. In another embodiment, the manual brake release can remove the compression of the spring by moving out the support wall of the spring on the caliper body or by unscrewing the piston assembly from the caliper body.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. For example, steps of the method(s) disclosed herein can be performed in an order other than that disclosed in the illustrated embodiments, and additional, fewer, or different steps may be performed and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. An electro-hydraulic brake actuator for a vehicle brake having a default brake engagement position, the actuator comprising:
    an electric motor configured to operate at about 28 Vdc, the motor further configured to operate at about 2 Amps to maintain a vehicle brake in a disengaged position; and
    a hydraulic master piston operatively coupled to the electric motor, the hydraulic master piston configured to slidingly move within a master cylinder fillable with a hydraulic fluid such that advancement of the master piston within the master cylinder varies the hydraulic pressure supplied to the vehicle brake,
    wherein the hydraulic piston is operatively coupled to the motor via a gear train mechanism coupled to a lead screw and a shaft of the motor, wherein the motor is configured to rotate the shaft to rotate one or more gears of the gear train, which in turn rotates the lead screw thereby causing the hydraulic master piston to move within the master cylinder.

2. The electro-hydraulic brake actuator of claim 1, wherein the motor operates the hydraulic master piston to vary the hydraulic pressure applied to the vehicle brake such that the vehicle brake can be fully engaged in about 100 ms or less and fully disengaged in about 200 ms or less.

3. The electro-hydraulic brake actuator of claim 1, further comprising:
    a controller that actuates the motor to slidingly move the master piston within the master cylinder in order to advance a brake pad into engagement with a disc of the vehicle brake so as to exert a braking force corresponding to a brake command signal, the controller actuating the motor to retract the brake pad from engagement with the disc until a detected brake force is approximately zero upon receipt of a brake release signal.

4. The electro-hydraulic brake actuator of claim 1, further comprising a bypass valve communicating the master cylinder with a hydraulic fluid reservoir, the bypass valve selectively actuatable by a controller to allow a flow of hydraulic fluid from the master cylinder into the reservoir to thereby reduce the hydraulic pressure in the master cylinder.

5. The electro-hydraulic brake actuator of claim 1, wherein the electric motor and hydraulic master cylinder are configured to fit within a wheel hub corresponding to the vehicle brake, the motor configured to operate the hydraulic master piston to vary the hydraulic pressure applied to the brake.

6. An electro-hydraulic brake actuator for a vehicle brake having a default brake engagement position, the actuator comprising:
    an electric motor configured to operate at about 28 Vdc, the motor further configured to operate at about 2 Amps to maintain a vehicle brake in a disengaged position; and
    a hydraulic master piston operatively coupled to the electric motor via a cam nut moveable along a lead screw, the hydraulic master piston configured to slidingly move within a master cylinder fillable with a hydraulic fluid such that advancement of the master piston within the master cylinder varies the hydraulic pressure supplied to the vehicle brake,
    wherein the electric motor and hydraulic master cylinder are configured to fit at least partially within a wheel hub corresponding to the vehicle brake.

7. The electro-hydraulic brake actuator of claim 6, wherein the motor operates the hydraulic master piston to vary the hydraulic pressure applied to the vehicle brake such that the vehicle brake can be fully engaged in about 100 ms or less and fully disengaged in about 200 ms or less.

8. The electro-hydraulic brake actuator of claim 6, wherein the electric motor and hydraulic master cylinder are configured to completely fit within a wheel hub corresponding to the vehicle brake.

9. The electro-hydraulic brake actuator of claim 6, wherein the cam nut comprises an inclined surface relative to its axis that contacts a portion of the piston, the piston configured to translate along the cylinder as the cam nut translates along the lead screw, thereby causing said portion of the piston to move along the inclined surface.

10. The electro-hydraulic brake actuator of claim 6, wherein the motor and the piston extend along axes that are at an angle relative to each other.

11. An electro-hydraulic brake actuator for a vehicle brake having a default brake engagement position, the actuator comprising:
an electric motor configured to operate at about 28 Vdc, the motor further configured to operate at about 2 Amps to maintain a vehicle brake in a disengaged position; and
a hydraulic master piston operatively coupled to the electric motor via a lead screw driven by a gear train mechanism coupled to the lead screw and a shaft of the motor, the hydraulic master piston configured to slidingly move within a master cylinder fillable with a hydraulic fluid such that advancement of the master piston within the master cylinder varies the hydraulic pressure supplied to the vehicle brake,
wherein the electric motor and hydraulic master cylinder are configured to at least partially fit within a wheel hub corresponding to the vehicle brake.

12. The electro-hydraulic brake actuator of claim 11, wherein the motor operates the hydraulic master piston to vary the hydraulic pressure applied to the vehicle brake such that the vehicle brake can be fully engaged in about 100 ms or less and fully disengaged in about 200 ms or less.

13. The electro-hydraulic brake actuator of claim 11, wherein the motor and the hydraulic master piston extend along generally parallel axes.

14. A method for operating an electro-hydraulic brake actuator for a vehicle brake having a default brake engagement position, comprising:
actuating an electric motor at about 28 Vdc;
translating a master piston within a master cylinder to increase the hydraulic pressure within the master cylinder to thereby retract a brake pad of a vehicle brake from engagement with a disc of the vehicle brake, the master cylinder being operatively coupled to the electric motor;
actuating the motor to advance the master piston to move the vehicle brake into a disengaged position out of engagement with the disc upon receipt of a brake release signal; and
operating the electric motor at about 2 Amps to maintain the vehicle brake in the disengaged position,
wherein actuating the motor to advance the master piston comprises rotating a motor shaft to in turn rotate a lead screw via a gear train, the lead screw coupled to the master piston.

15. The method of claim 14, wherein actuating the motor to advance the master piston to move the vehicle brake into the disengaged position includes moving the brake pad away from the disc until a detected brake force is approximately zero.

16. The method of claim 14, wherein translating the master piston to advance the brake pad into engagement with the disc includes advancing the brake pad into engagement with the disc in about 100 ms or less.

17. The method of claim 14, wherein advancing the master piston to move vehicle brake into the disengaged position includes retracting the brake pad out of engagement with the disc in about 200 ms or less.

18. The method of claim 14, further comprising
detecting at least one of a loss of power and a loss of hydraulic pressure, and
opening a bypass valve between the master cylinder and a hydraulic fluid reservoir to allow flow of hydraulic fluid from the master cylinder to the reservoir, thereby reducing a hydraulic pressure in the master cylinder and allowing the brake pad to engage the brake disc.

19. The method of claim 14, wherein actuating the motor to advance the master piston comprises rotating a lead screw to advance a cam nut having an outer inclined surface along a length of the lead screw, which causes an end of the master piston in contact with the cam nut to move up the inclined surface of the cam nut to thereby advance the master piston within the master cylinder.

* * * * *

UNITED STATES PATENT AND TRADEMARK OFFICE
CERTIFICATE OF CORRECTION

| | |
|---|---|
| PATENT NO. | : 8,104,589 B2 |
| APPLICATION NO. | : 12/176242 |
| DATED | : January 31, 2012 |
| INVENTOR(S) | : Xavier Ollat, Yingpei Guo and Robert Lotter |

It is certified that error appears in the above-identified patent and that said Letters Patent is hereby corrected as shown below:

At column 6, line 33, please delete "510a ." and insert --510a.--, therefor.

At column 7, line 57, please delete "214b ." and insert --214b.--, therefor.

At column 8, line 11, please delete "thereof" and insert --thereof.--, therefor.

At column 8, line 42, please delete "232a -c" and insert --232a-c--, therefor.

At column 8, line 42, please delete "230a -c ." and insert --230a-c.--, therefor.

At column 8, line 43-44, please delete "232a -c" and insert --232a-c--, therefor.

At column 8, line 44, please delete "236a -c" and insert --236a-c--, therefor.

At column 8, line 45, please delete "230a -c" and insert --230a-c--, therefor.

At column 8, line 46, please delete "236a -c" and insert --236a-c--, therefor.

At column 8, line 46, please delete "236a -c" and insert --236a-c--, therefor.

At column 8, line 49, please delete "236a -c" and insert --236a-c--, therefor.

At column 8, line 61, please delete "236a -c," and insert --236a-c,--, therefor.

At column 9, line 23, please delete "thereof" and insert --thereof.--, therefor.

At column 9, line 58, please delete "2510a ." and insert --2510a.--, therefor.

At column 10, line 23, please delete "2514b ." and insert --2514b.--, therefor.

At column 11, line 3, please delete "2234d ." and insert --2234d.--, therefor.

At column 11, line 63, please delete "2216c ," and insert --2216c,--, therefor.

At column 14, line 40, please delete "FIG. 18" and insert --FIG. 18.--, therefor.

At column 15, line 37, please delete "2400 ,3040" and insert --2400, 3040--, therefor.

At column 17, line 25, please delete "Hydraulic" and insert --hydraulic--, therefor.

At column 17, line 25, please delete "electric" and insert --electrical--, therefor.

At column 17, line 26, please delete "cylider" and insert --cylinder--, therefor.

At column 17, line 27, please delete "pressuer" and insert --pressure--, therefor.

Signed and Sealed this
Fourth Day of December, 2012

David J. Kappos
*Director of the United States Patent and Trademark Office*

At column 17, line 38, please delete "thereof" and insert --thereof.--, therefor.

In claim 18 at column 20, line 23, please delete "comprising" and insert --comprising:--, therefor.